(12) United States Patent
Terada

(10) Patent No.: US 11,453,092 B2
(45) Date of Patent: Sep. 27, 2022

(54) BLADE REPLACING APPARATUS AND ADJUSTING METHOD OF BLADE REPLACING APPARATUS

(71) Applicant: DISCO CORPORATION, Tokyo (JP)

(72) Inventor: Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 1 day.

(21) Appl. No.: 17/236,203

(22) Filed: Apr. 21, 2021

(65) Prior Publication Data

US 2021/0354257 A1   Nov. 18, 2021

(30) Foreign Application Priority Data

May 18, 2020 (JP) .............................. JP2020-086857

(51) Int. Cl.
*B23Q 3/157* (2006.01)
*B23Q 3/155* (2006.01)

(52) U.S. Cl.
CPC ........ *B23Q 3/15503* (2016.11); *B23Q 3/1554* (2013.01); *B23Q 3/15546* (2013.01); *B23Q 3/15526* (2013.01); *B23Q 3/15722* (2016.11); *Y10T 483/10* (2015.01); *Y10T 483/13* (2015.01); *Y10T 483/174* (2015.01)

(58) Field of Classification Search
CPC ............... Y10T 483/13; Y10T 483/132; Y10T 483/134; Y10T 483/136; Y10T 483/138; G05B 19/402; G05B 19/404; B23Q 3/15503; B23Q 3/15546; B23Q 3/1554
USPC ............. 483/1, 7, 8, 9, 10, 11; 700/186, 193
See application file for complete search history.

(56) References Cited

U.S. PATENT DOCUMENTS

| | | | | | |
|---|---|---|---|---|---|
| 5,974,543 | A | * | 10/1999 | Hilgendorf | ........... G06F 9/4486 712/240 |
| 2016/0318145 | A1 | * | 11/2016 | Kawanishi | ............. G01B 11/08 |
| 2018/0222002 | A1 | * | 8/2018 | Kasahara | ........... B23Q 3/15513 |
| 2018/0354085 | A1 | * | 12/2018 | Li | ........................ B23Q 11/001 |
| 2019/0009379 | A1 | * | 1/2019 | Kiuchi | ............... B23Q 3/15503 |

FOREIGN PATENT DOCUMENTS

| | | | | | |
|---|---|---|---|---|---|
| CN | 108637763 | A | * | 10/2018 | ........... B23Q 3/1552 |
| JP | 06326186 | A | | 11/1994 | |
| JP | 09091044 | A | * | 4/1997 | ......... B23Q 17/0909 |
| JP | 2007105829 | A | * | 4/2007 | |
| JP | 2007208114 | A | * | 8/2007 | |
| JP | 2016144838 | A | | 8/2016 | |
| WO | WO-2015104945 | A1 | * | 7/2015 | ......... B23Q 17/0909 |

* cited by examiner

*Primary Examiner* — Erica E Cadugan
*Assistant Examiner* — Michael Vitale
(74) *Attorney, Agent, or Firm* — Greer Burns & Crain Ltd.

(57) ABSTRACT

There is provided a blade replacing apparatus for replacing a cutting blade. The blade replacing apparatus includes a blade storage unit including a movable storage section configured to store the cutting blade, a transporting unit including a holding unit configured to hold the cutting blade and a moving mechanism configured to move the holding unit, a camera configured to photograph the holding unit, and a control unit including an operation control section configured to control operation of the blade storage unit and the transporting unit and a position registration section in which positions of the storage section and the holding unit. The storage section includes a first mark portion photographable by the camera, and the holding unit includes a second mark portion photographable by the camera.

2 Claims, 10 Drawing Sheets

BLADE REPLACING APPARATUS AND ADJUSTING METHOD OF BLADE REPLACING APPARATUS

BACKGROUND OF THE INVENTION

Field of the Invention

The present invention relates to a blade replacing apparatus that replaces a cutting blade mounted in a cutting apparatus and an adjusting method of the blade replacing apparatus.

Description of the Related Art

In a device chip manufacturing process, a wafer which has a device such as an integrated circuit (IC) or a large scale integration (LSI) formed in each of a plurality of regions demarcated by a plurality of planned dividing lines (streets) intersecting each other is used. A plurality of device chips including respective devices are obtained by dividing the wafer along the planned dividing lines. The device chips are mounted in various electronic apparatuses such as mobile telephones or personal computers.

A cutting apparatus is used to divide a workpiece typified by the above-described wafer. The cutting apparatus includes a chuck table that holds the workpiece and a cutting unit that performs cutting processing on the workpiece. The cutting unit includes a spindle to which an annular cutting blade for cutting the wafer is fixed. The cutting blade is fixed to a distal end portion of the spindle by a nut. The workpiece is cut and divided by making the cutting blade fitted to the cutting unit rotate and cut into the workpiece.

The cutting blade is periodically replaced because the cutting blade is worn by cutting the workpiece. When the cutting blade is to be replaced, first, the used cutting blade is removed by loosening and removing the nut fixing the cutting blade. Thereafter, a replacement cutting blade is fitted to the distal end portion of the spindle, and the replacement cutting blade is fixed by the nut. Manual work of replacing the cutting blade takes time and effort, and there is a fear of the cutting blade or the nut being accidentally dropped during the work. Accordingly, attempts have been made to replace the cutting blade automatically. JP Hei 6-326186A discloses a blade replacing apparatus that automatically replaces a cutting blade. This blade replacing apparatus includes a mechanism of attaching and detaching cutting blades (blade attaching and detaching means) and a mechanism of attaching and detaching the nut for fixing a cutting blade to the spindle (nut attaching and detaching means). In addition, JP 2016-144838A discloses a position adjusting jig for performing alignment between the blade replacing apparatus and the spindle.

SUMMARY OF THE INVENTION

The blade replacing apparatus includes a blade holding unit that holds the used cutting blade fixed to the distal end portion of the spindle and a replacement cutting blade (unused cutting blade) stored by a predetermined blade storage unit. For example, the blade holding unit holds a cutting blade by sandwiching the cutting blade by a plurality of gripping members (gripping pawls). When a cutting blade is to be replaced, first, the blade holding unit holds a replacement cutting blade stored by the blade storage unit. At this time, when alignment between the blade holding unit and the blade storage unit is not performed accurately, it is difficult for the blade holding unit to hold the replacement cutting blade appropriately.

In addition, a blade holding unit having a mechanism of sucking and holding a cutting blade may be used in place of the blade holding unit that grips a cutting blade by the plurality of gripping members. The blade holding unit having the mechanism of sucking and holding the cutting blade can suck any position of the cutting blade. Thus, even when there is some error in alignment between the blade holding unit and the blade storage unit, the blade holding unit can suck and hold the replacement cutting blade. On the other hand, positional relation between the replacement cutting blade and the blade holding unit tends to vary in a state in which the blade holding unit sucks and holds the replacement cutting blade. When the position of the replacement cutting blade with respect to the blade holding unit varies, positional relation between the replacement cutting blade and the spindle also varies when the replacement cutting blade is fitted to the spindle. As a result, when the replacement cutting blade is brought close to the spindle, the cutting blade may inappropriately come into contact with the spindle, and the cutting blade or the spindle may be damaged, or broken pieces of the cutting blade may adhere to the spindle, so that the work of replacing the cutting blade may be consequently hindered.

The present invention has been made in view of such problems. It is an object of the present invention to provide a blade replacing apparatus that can appropriately hold a cutting blade and an adjusting method of the blade replacing apparatus.

In accordance with an aspect of the present invention, there is provided an adjusting method of a blade replacing apparatus for replacing a cutting blade that is fixed to a distal end portion of a spindle included in a cutting apparatus and is configured to cut a workpiece. The blade replacing apparatus includes a blade storage unit including a movable storage section configured to store the cutting blade on a front side of a transparent supporting member, a transporting unit configured to transport the cutting blade, the transporting unit including a holding unit configured to hold the cutting blade and a moving mechanism configured to move the holding unit between the storage section and the spindle, a camera disposed on a back side of the supporting member and configured to photograph the holding unit positioned on the front side of the supporting member via the supporting member, and a control unit including an operation control section configured to control operation of the blade storage unit and the transporting unit and a position registration section in which positions of the storage section and the holding unit when the cutting blade is attached or detached to or from the blade storage unit are registered. The storage section includes a first mark portion photographable by the camera, and the holding unit includes a second mark portion photographable by the camera. The adjusting method includes a registering step of obtaining an image including the first mark portion and the second mark portion by photographing the first mark portion and photographing the second mark portion through the supporting member by the camera, and registering the positions of the storage section and the holding unit when the first mark portion and the second mark portion are arranged in predetermined positional relation on a basis of the image as designated positions in the position registration section, a determining step of moving the storage section and the holding unit such that the storage section and the holding unit are arranged at the designated positions registered in the position registration section, and determining whether or not the first mark portion and the second mark portion are arranged in the predetermined positional relation, and an overwriting step of overwriting the positions of the storage section and the holding unit as the designated positions in the position registration section after adjusting the position of the storage section or the holding unit such that the first mark portion and the second mark portion are arranged in the predetermined relation when the determining step determines that the first mark portion and the second mark portion are not arranged in the predetermined positional relation.

Incidentally, preferably, the holding unit is a sucking and holding portion configured to suck and hold the cutting blade or a gripping portion configured to grip the cutting blade.

In accordance with another aspect of the present invention, there is provided a blade replacing apparatus for replacing a cutting blade that is fixed to a distal end portion of a spindle included in a cutting apparatus and is configured to cut a workpiece. The blade replacing apparatus includes a blade storage unit including a movable storage section configured to store the cutting blade on a front side of a transparent supporting member, a transporting unit configured to transport the cutting blade, the transporting unit including a holding unit configured to hold the cutting blade and a moving mechanism configured to move the holding unit between the storage section and the spindle, a camera disposed on a back side of the supporting member and configured to photograph the holding unit positioned on the front side of the supporting member via the supporting member, and a control unit including an operation control section configured to control operation of the blade storage unit and the transporting unit and a position registration section in which positions of the storage section and the holding unit when the cutting blade is attached or detached to or from the blade storage unit are registered. The storage section includes a first mark portion photographable by the camera, and the holding unit includes a second mark portion photographable by the camera.

Incidentally, preferably, the holding unit is a sucking and holding portion configured to suck and hold the cutting blade or a gripping portion configured to grip the cutting blade.

The blade replacing apparatus according to one aspect of the present invention includes the storage section provided with the first mark portion that can be photographed by the camera and the holding unit provided with the second mark portion that can be photographed by the camera. It is thereby possible to determine whether or not the first mark portion and the second mark portion are arranged in the predetermined positional relation on the basis of the image obtained by the camera, and thus check whether the positional relation between the storage section and the holding unit is proper or not. Then, when it is determined that the first mark portion and the second mark portion are not arranged in the predetermined positional relation, the positional relation between the storage section and the holding unit is adjusted, and the positions of the storage section and the holding unit when the positional relation between the storage section and the holding unit is adjusted can be overwritten as designated positions in the registration section. Thus, the appropriate positional relation between the storage section and the holding unit is periodically updated, and a state in which the holding unit can appropriately hold the cutting blade stored in the storage section is maintained.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
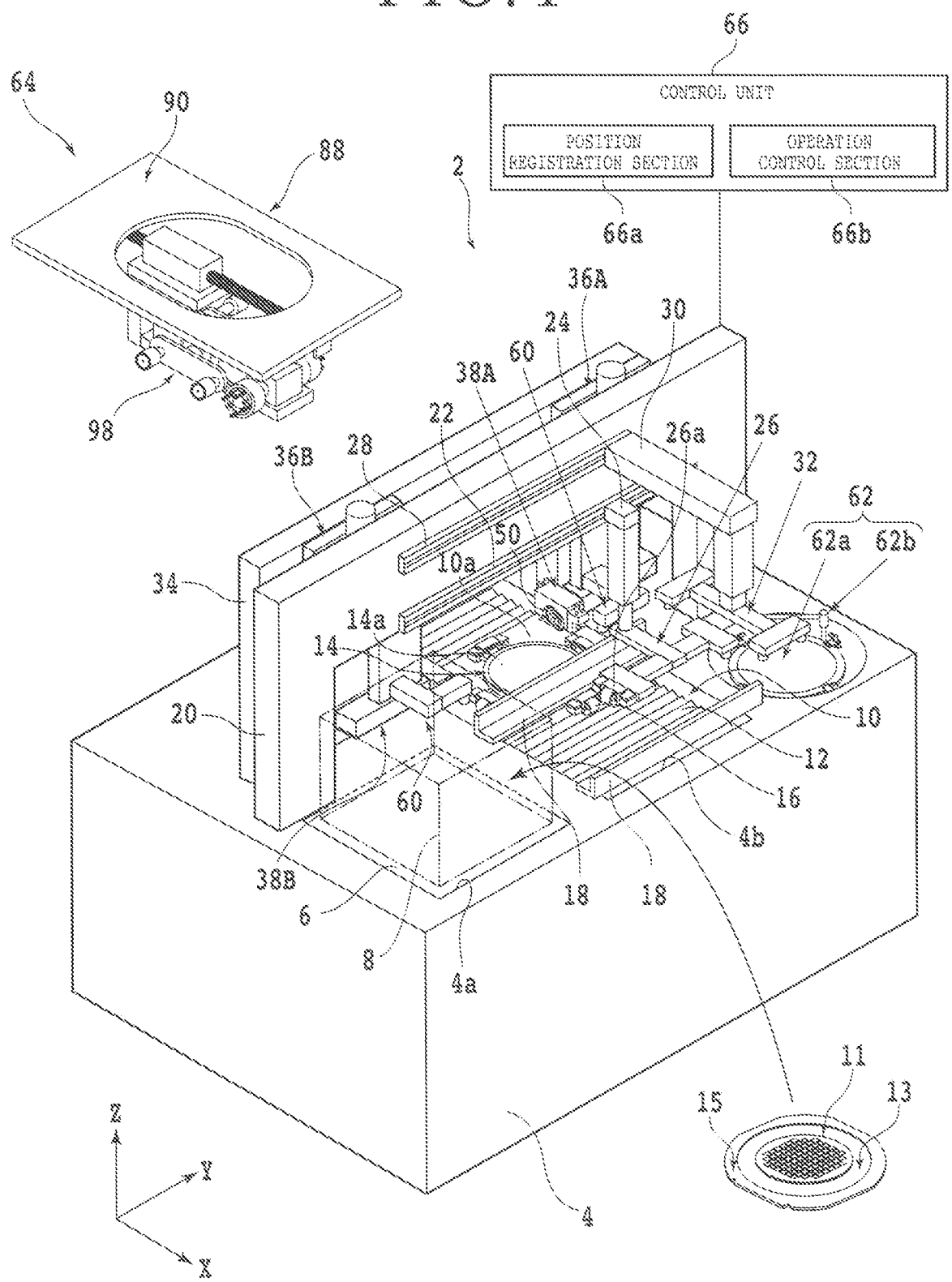
FIG. 1 is a perspective view depicting a cutting apparatus.

An embodiment according to one aspect of the present invention will hereinafter be described with reference to the accompanying drawings. Description will first be made of an example of a configuration of a cutting apparatus according to the present embodiment. FIG. 1 is a perspective view depicting a cutting apparatus 2. Incidentally, in FIG. 1, an X-axis direction (a processing feed direction, a first horizontal direction, and a front-rear direction) and a Y-axis direction (an indexing feed direction, a second horizontal direction, and a left-right direction) are directions perpendicular to each other. In addition, a Z-axis direction (a vertical direction, an upward-downward direction, and a height direction) is a direction perpendicular to the X-axis direction and the Y-axis direction.

The cutting apparatus 2 includes a base 4 that supports or houses constituent elements constituting the cutting apparatus 2. An opening 4a is formed in a corner portion on a front side of the base 4. A cassette holding base 6 raised and lowered by a raising and lowering mechanism (not depicted) is provided within the opening 4a. A cassette 8 that can house a plurality of workpieces 11 is disposed on an upper surface of the cassette holding base 6. Incidentally, in FIG. 1, the contour of the cassette 8 is indicated by a chain double-dashed line.

The workpiece 11 is, for example, a disk-shaped wafer formed of a semiconductor material such as silicon. The top surface side of the workpiece 11 is demarcated into a plurality of regions by a plurality of planned dividing lines (streets) arranged in a lattice manner so as to intersect each other. A device such as an IC or an LSI is formed in each of the regions. A plurality of device chips each including each of the devices are obtained when the cutting apparatus 2 cuts and divides the workpiece 11 along the planned dividing lines.

A circular tape (dicing tape) 13 having a larger diameter than that of the workpiece 11 is affixed to the undersurface (lower surface) side of the workpiece 11. Usable as the tape 13 is a sheet or the like including a film-shaped substrate formed in a circular shape and an adhesive layer (glue layer) provided on the substrate. For example, the substrate is formed of a resin such as polyolefin, polyvinyl chloride, or polyethylene terephthalate, and the adhesive layer is formed of an epoxy-based, acrylic-based, or rubber-based adhesive or the like. In addition, an ultraviolet curable resin that is cured by being irradiated with an ultraviolet ray may be used as the adhesive layer.

In addition, an outer circumferential portion of the tape 13 is affixed to an annular frame 15 that is formed of a metal or the like and that has a circular opening in a central portion thereof. The diameter of the opening of the frame 15 is larger than the diameter of the workpiece 11. The workpiece 11 is disposed within the opening of the frame 15. When the tape 13 is affixed to the workpiece 11 and the frame 15, the workpiece 11 is supported by the frame 15 via the tape 13. Then, the workpiece 11 supported by the frame 15 is housed into the cassette 8.

It is to be noted that there are no limitations on the material, shape, structure, size, and the like of the workpiece 11. For example, the workpiece 11 may be a wafer formed of a semiconductor other than silicon (GaAs, InP, GaN, SiC, or the like), a ceramic, a resin, a metal, or the like. In addition, there are no limitations on the kind, quantity, shape, structure, size, arrangement, and the like of the devices formed on the workpiece 11 either. The devices may not be formed on the workpiece 11.

A rectangular opening 4b having a longitudinal direction along the X-axis direction is provided on a side of the opening 4a. Arranged within the opening 4b are a moving mechanism 10 of a ball screw type and a bellows-shaped dust-proof and drip-proof cover 12 that covers an upper portion of the moving mechanism 10 and which can be expanded or contracted in the X-axis direction. The moving mechanism 10 includes a moving table 10a in a flat plate shape. The moving mechanism 10 moves the moving table 10a along the X-axis direction.

A chuck table (holding table) 14 that holds the workpiece 11 is provided on the moving table 10a. The chuck table 14 is connected to a rotational driving source (not depicted) such as a motor, and is thereby rotated about a rotational axis substantially parallel with the Z-axis direction. In addition, the chuck table 14 is moved by the moving mechanism 10 along the X-axis direction together with the moving table 10a (processing feed). The upper surface of the chuck table 14 constitutes a holding surface 14a that holds the workpiece 11. The holding surface 14a is connected to a suction source (not depicted) such as an ejector via a suction passage (not depicted), the suction passage being formed inside the chuck table 14, a valve (not depicted), and the like. In addition, a plurality of clamps 16 that grip and fix the frame 15 supporting the workpiece 11 are provided on the periphery of the chuck table 14.

A pair of guide rails 18 arranged along the Y-axis direction is provided above the opening 4b. The pair of guide rails 18 has a supporting surface that supports the frame 15 supporting the workpiece 11 from below and a side surface substantially perpendicular to the supporting surface. The pair of guide rails 18 moves so as to approach and separate from each other while maintaining a state of being substantially parallel with the Y-axis direction. The pair of guide rails 18 arranges the workpiece 11 and the frame 15 at a predetermined position by sandwiching the frame 15 by the side surfaces (positioning).

A gate-shaped first supporting structure 20 is disposed on the base 4 so as to straddle the opening 4b. A rail 22 is fixed to the front side (guide rail 18 side) of the first supporting structure 20 along the Y-axis direction. A holding unit 26 that holds the workpiece 11 is coupled to the rail 22 via a moving mechanism 24. The moving mechanism 24 moves the holding unit 26 in the Y-axis direction along the rail 22. In addition, the moving mechanism 24 includes an air cylinder. The air cylinder includes a rod that is raised and lowered along the Z-axis direction. The holding unit 26 is fixed to a lower end portion of the rod of the air cylinder. The holding unit 26 holds the frame 15 positioned by the pair of guide rails 18 and transfers the frame 15 onto the chuck table 14. For example, the holding unit 26 has a plurality of suction pads that suck and hold the upper surface side of the frame 15 supporting the workpiece 11. The holding unit 26 holds the workpiece 11 by sucking the frame 15 by the suction pads.

In addition, a gripping mechanism 26a that grips an edge portion of the frame 15 is provided to an end portion on the opening 4a side (cassette holding base 6 side) of the holding unit 26. The frame 15 is drawn out from the cassette 8 onto the pair of guide rails 18 by moving the holding unit 26 in a direction of going away from the cassette 8 along the Y-axis direction in a state in which the gripping mechanism 26a grips the frame 15 housed in the cassette 8. In addition, the frame 15 is housed into the cassette 8 by moving the holding unit 26 to the cassette 8 side along the Y-axis direction in a state in which the gripping mechanism 26a grips the frame 15 disposed on the pair of guide rails 18.

Further, a rail 28 is fixed to the front side of the first supporting structure 20 along the Y-axis direction. A holding unit 32 that holds the workpiece 11 is coupled to the rail 28 via a moving mechanism 30. The moving mechanism 30 moves the holding unit 32 in the Y-axis direction along the rail 28. In addition, the moving mechanism 30 includes an air cylinder. The air cylinder includes a rod that is raised and lowered along the Z-axis direction. The holding unit 32 is fixed to a lower end portion of the rod of the air cylinder. For example, the holding unit 32 has a plurality of suction pads that suck and hold the upper surface side of the frame 15 supporting the workpiece 11. The holding unit 32 holds the workpiece 11 by sucking the frame 15 by the suction pads.

A gate-shaped second supporting structure 34 is disposed in the rear of the first supporting structure 20 so as to straddle the opening 4b. A pair of moving mechanisms 36A and 36B is fixed to end portions on both sides of the front side (first supporting structure 20 side) of the second supporting structure 34. A cutting unit 38A is fixed to a lower portion of the moving mechanism 36A. A cutting unit 38B is fixed to a lower portion of the moving mechanism 36B. The moving mechanism 36A is a ball screw type moving mechanism that moves the cutting unit 38A along the Y-axis direction and the Z-axis direction. The moving mechanism 36A controls a position in the Y-axis direction and the Z-axis direction of the cutting unit 38A. In addition, the moving mechanism 36B is a ball screw type moving mechanism that moves the cutting unit 38B along the Y-axis direction and the Z-axis direction. The moving mechanism 36B controls a position in the Y-axis direction and the Z-axis direction of the cutting unit 38B.

Figure 2:
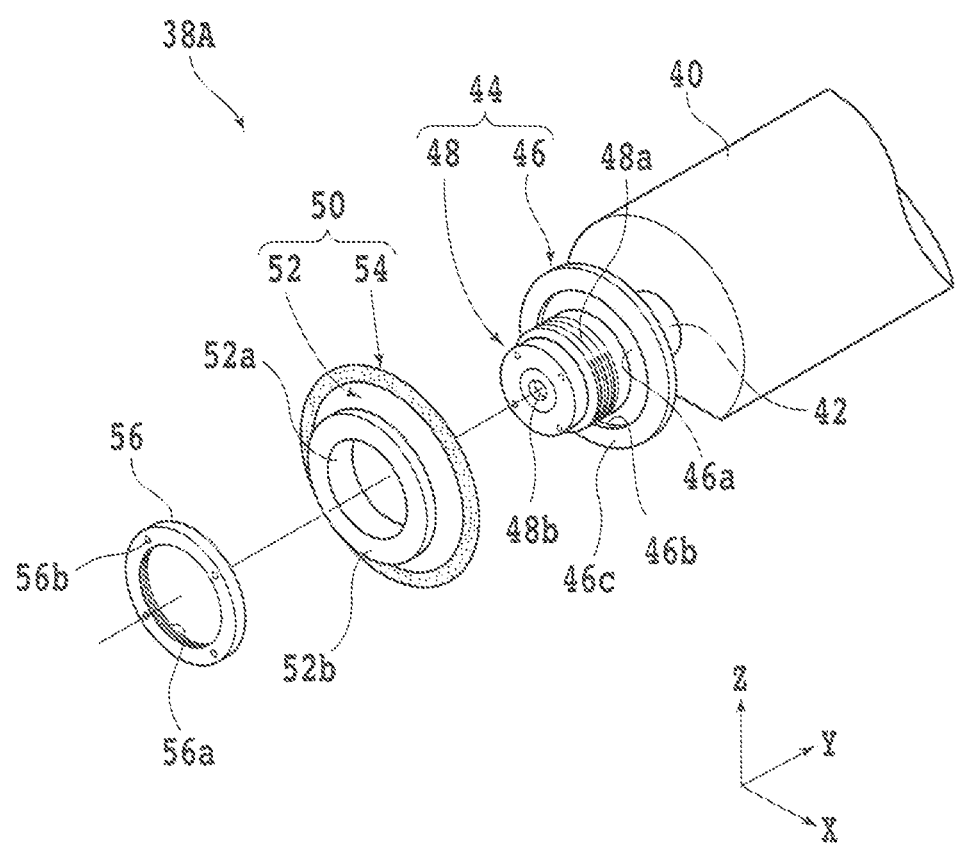
FIG. 2 is a perspective view depicting a cutting unit.

FIG. 2 is a perspective view depicting the cutting unit 38A. The cutting unit 38A includes a cylindrical housing 40.

The housing 40 houses a cylindrical spindle (rotary shaft) 42 disposed along the Y-axis direction. A distal end portion (one end side) of the spindle 42 is exposed to the outside of the housing 40. A mount 44 is fixed to the distal end portion. In addition, a rotational driving source (not depicted) such as a motor that rotates the spindle 42 is coupled to a proximal end portion (another end side) of the spindle 42.

The mount 44 includes a disk-shaped flange portion 46 and a cylindrical supporting shaft 48 that projects from a central portion of a front surface 46a of the flange portion 46. An annular protruding portion 46b that projects from the front surface 46a is provided to the front surface 46a side of an outer circumferential portion of the flange portion 46. A front end surface 46c of the protruding portion 46b is formed substantially in parallel with the front surface 46a. A threaded portion 48a is formed on the outer circumferential surface of the supporting shaft 48. In addition, a recessed portion 48b is formed in a central portion of the front end surface of the supporting shaft 48. An annular cutting blade 50 that cuts the workpiece 11 is fitted to the supporting shaft 48.

The cutting blade 50 includes an annular base 52 formed of a metal or the like and an annular cutting edge 54 formed along an outer edge portion of the base 52. A cylindrical opening 52a that penetrates the base 52 in a thickness direction is provided in a central portion of the base 52. In addition, an annular protruding portion 52b that protrudes in the thickness direction of the base 52 is formed on the periphery of the opening 52a of the base 52. The cutting edge 54 is, for example, formed by fixing abrasive grains formed of diamond or the like by a nickel plating layer. However, the materials of the abrasive grains and bonding material of the cutting edge 54 are not limited, but are selected as appropriate according to the material of the workpiece 11, a purpose of processing, and the like.

An annular nut 56 for fixing the cutting blade 50 is fastened to the threaded portion 48a of the supporting shaft 48. An opening 56a in a circular shape corresponding to the diameter of the supporting shaft 48 is formed in a central portion of the nut 56. A thread groove corresponding to the threaded portion 48a formed on the supporting shaft 48 is formed in the opening 56a. In addition, a plurality of through holes 56b that penetrate the nut 56 in a thickness direction are formed in the nut 56 at substantially equal intervals along the circumferential direction of the nut 56.

The cutting blade 50 is fitted to the mount 44 such that the supporting shaft 48 is inserted into the opening 52a of the base 52. Then, when the nut 56 is screwed and fastened onto the threaded portion 48a of the supporting shaft 48 in a state in which the cutting blade 50 is fitted to the mount 44, the cutting blade 50 is sandwiched by the front end surface 46c of the flange portion 46 and the nut 56. The cutting blade 50 is thereby fixed to the distal end portion of the spindle 42.

Incidentally, while the configuration of the cutting unit 38A has been described above, the configuration of the cutting unit 38B is similar to that of the cutting unit 38A. The cutting blade 50 fitted to the cutting unit 38A and the cutting blade 50 fitted to the cutting unit 38B are arranged so as to face each other.

As depicted in FIG. 1, a camera (imaging unit) 60 that images the workpiece 11 held on the chuck table 14 and the like is provided at each of positions adjacent to the cutting units 38A and 38B. The camera 60 is, for example, formed by a visible light camera including an imaging element that receives visible light and converts the visible light into an electric signal, an infrared camera including an imaging element that receives an infrared ray and converts the infrared ray into an electric signal, or the like. Alignment between the workpiece 11 and the cutting units 38A and 38B is performed on the basis of an image obtained by imaging the workpiece 11 on the chuck table 14 by the camera 60, for example.

A cleaning unit 62 is disposed on a side of the opening 4b (opposite side from the opening 4a). The cleaning unit 62 includes a spinner table 62a that holds the workpiece 11 within a tubular cleaning space. The spinner table 62a is coupled with a rotational driving source (not depicted) such as a motor that rotates the spinner table 62a about a rotational axis substantially parallel with the Z-axis direction. Disposed above the spinner table 62a is a nozzle 62b that jets a cleaning fluid (for example, a mixed fluid obtained by mixing water and air with each other) to the workpiece 11 held by the spinner table 62a. The workpiece 11 is cleaned by jetting the fluid from the nozzle 62b to the workpiece 11 while rotating the spinner table 62a holding the workpiece 11.

A blade replacing apparatus (blade replacing mechanism) 64 for replacing cutting blades 50 is provided on the back side (rear side) of the second supporting structure 34. The blade replacing apparatus 64 replaces used cutting blades 50 fitted to the cutting units 38A and 38B with replacement cutting blades 50 (unused cutting blades 50), and attaches and detaches nuts 56 (see FIG. 2) for fixing the cutting blades 50 to the distal end portions of the spindles 42. Incidentally, details of a configuration of the blade replacing apparatus 64 will be described later.

Each constituent element constituting the cutting apparatus 2 (the moving mechanism 10, the chuck table 14, the clamps 16, the guide rails 18, the moving mechanism 24, the holding unit 26, the moving mechanism 30, the holding unit 32, the moving mechanisms 36A and 36B, the cutting units 38A and 38B, the camera 60, the cleaning unit 62, the blade replacing apparatus 64, and the like) is connected to a control unit (control section) 66. The control unit 66 generates a control signal for controlling operation of each constituent element of the cutting apparatus 2, and thereby controls operation of the cutting apparatus 2.

The control unit 66 is, for example, formed by a computer. The control unit 66 includes a processing unit that performs various kinds of processing (computation and the like) necessary for the operation of the cutting apparatus 2 and a storage unit that stores various kinds of information (data, a program, and the like) used for the processing by the processing unit. The processing unit includes a processor such as a central processing unit (CPU). In addition, the storage unit includes various kinds of memories constituting a main storage apparatus, an auxiliary storage apparatus, and the like.

The above-described cutting apparatus 2 performs cutting processing on the workpiece 11. When the workpiece 11 is to be processed, the workpiece 11 to be processed is first housed into the cassette 8. Then, the cassette 8 is mounted on the upper surface of the cassette holding base 6.

The holding unit 26 unloads the workpiece 11 housed in the cassette 8 from the cassette 8. Specifically, the holding unit 26 moves along the X-axis direction so as to go away from the cassette 8 in a state in which the gripping mechanism 26a grips an end portion of the frame 15. Thus, the workpiece 11 is drawn out from the cassette 8 and is disposed on the pair of guide rails 18. Then, the workpiece 11 is positioned by sandwiching the workpiece 11 between the pair of guide rails 18. Next, the upper surface side of the frame 15 is held by the holding unit 26, and the workpiece 11 is transported onto the chuck table 14. The workpiece 11 is disposed on the chuck table 14 via the tape 13. In addition, the frame 15 is fixed by the plurality of clamps 16. When a negative pressure of the suction source is made to act on the holding surface 14a in this state, the chuck table 14 sucks and holds the workpiece 11 via the tape 13.

Then, the cutting blades 50 fitted to the cutting units 38A and 38B cut into the workpiece 11 while rotating, and thereby the workpiece 11 is subjected to cutting processing. For example, the workpiece 11 is cut along the planned dividing lines by the cutting blades 50, and is thereby divided into a plurality of device chips. When the processing of the workpiece 11 is completed, the holding unit 32 holds the upper surface side of the frame 15 and transports the workpiece 11 from the chuck table 14 to the cleaning unit 62. Then, the cleaning unit 62 cleans the workpiece 11. When the cleaning of the workpiece 11 is completed, the holding unit 26 holds the upper surface side of the frame 15 and transports the workpiece 11 onto the pair of guide rails 18. Then, the workpiece 11 and the frame 15 are positioned by sandwiching the frame 15 between the pair of guide rails 18. Thereafter, the holding unit 26 moves to the cassette 8 side in a state in which the gripping mechanism 26a grips the frame 15, and houses the workpiece 11 into the cassette 8.

The workpiece 11 is thus processed by the cutting apparatus 2. Incidentally, the storage unit of the control unit 66 stores a program describing a series of operations of the cutting apparatus 2 described above. When an operator gives the cutting apparatus 2 an instruction to process the workpiece 11, the processing unit of the control unit 66 reads a program from the storage unit and executes the program, and sequentially generates a control signal for controlling operation of each constituent element of the cutting apparatus 2.

Here, the cutting blades 50 fitted to the cutting units 38A and 38B are gradually worn by cutting the plurality of workpieces 11, and are therefore replaced periodically. The replacement of the cutting blades 50 is automatically performed by the blade replacing apparatus 64.

Figure 3:
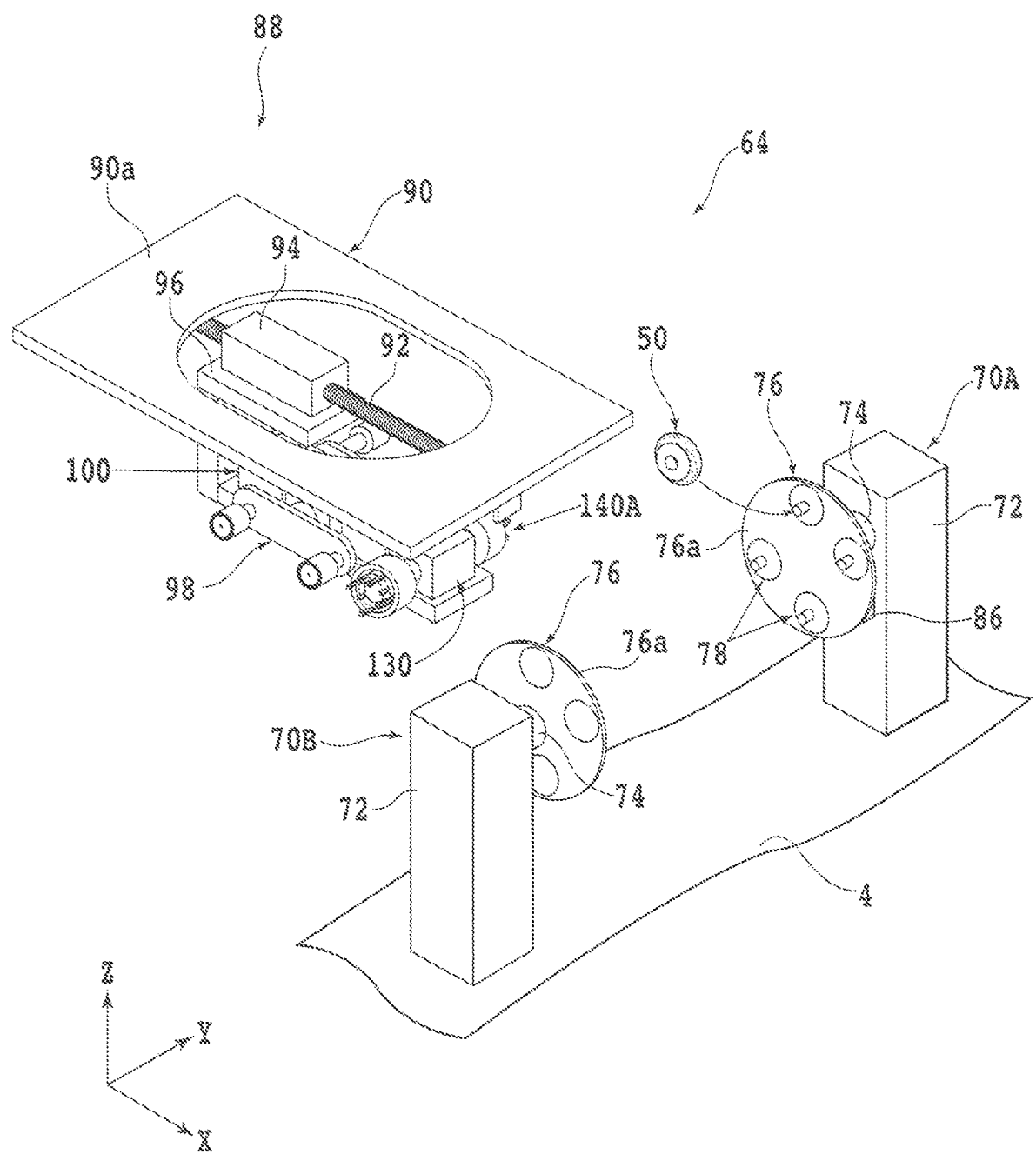
FIG. 3 is a perspective view depicting a blade replacing apparatus.

FIG. 3 is a perspective view depicting the blade replacing apparatus 64. The blade replacing apparatus 64 includes a pair of blade storage units (blade racks) 70A and 70B that hold and store a plurality of cutting blades 50. The blade storage units 70A and 70B are arranged so as to be opposed to each other along the Y-axis direction. The blade storage units 70A and 70B each store a used cutting blade 50 used for cutting workpieces 11 and a replacement cutting blade 50 (unused cutting blade 50).

The blade storage units 70A and 70B each include a columnar supporting structure 72 disposed along the Z-axis direction. For example, the supporting structure 72 is provided in the rear of the second supporting structure 34 (see FIG. 1) and is fixed to the upper surface of the base 4. However, there is no limitation on the installation position of the supporting structure 72. A cylindrical rotary shaft 74 disposed along the Y-axis direction is housed in the supporting structure 72. A distal end portion (one end side) of the rotary shaft 74 is exposed from a side surface of the supporting structure 72. A proximal end portion (another end side) of the rotary shaft 74 is coupled with a rotational driving source (not depicted) such as a motor. In addition, a disk-shaped supporting member 76 is fixed to the distal end portion of the rotary shaft 74. The supporting member 76 is rotated about a rotational axis substantially parallel with the Y-axis direction by power transmitted from the rotational driving source via the rotary shaft 74.

Figure 4:
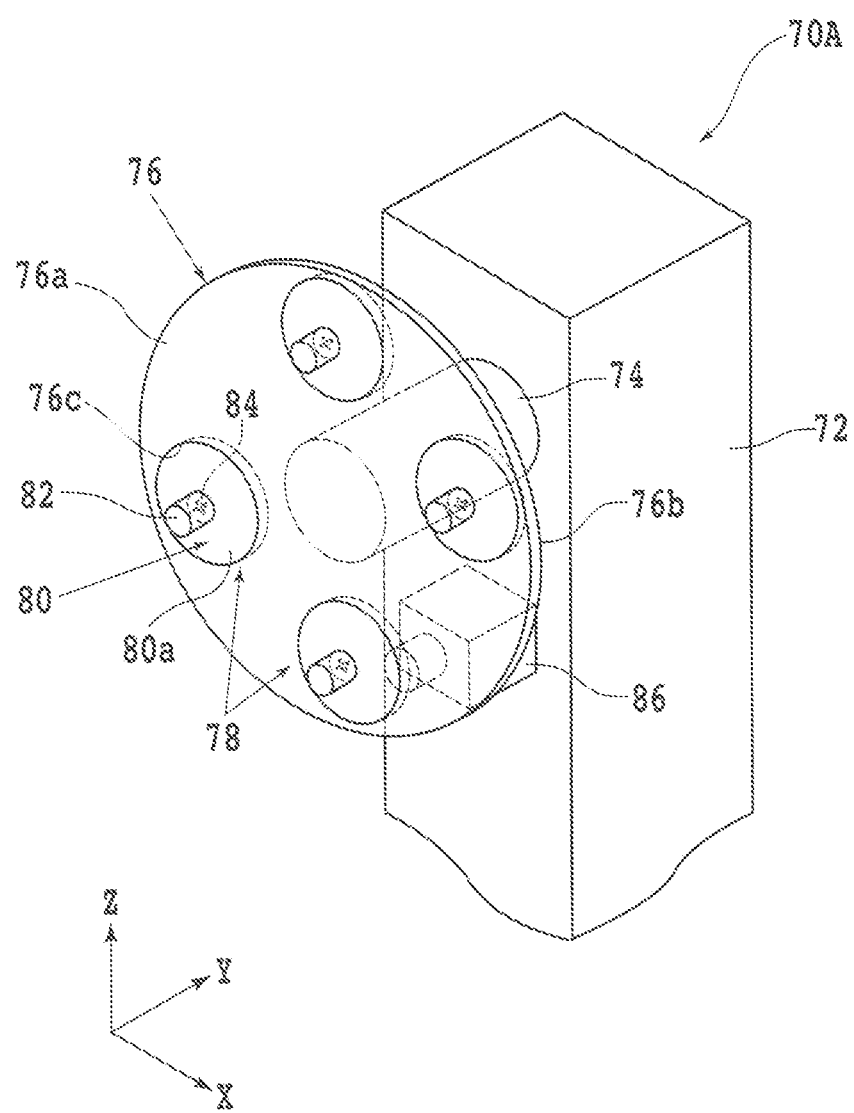
FIG. 4 is a perspective view depicting a blade storage unit.

FIG. 4 is a perspective view depicting the blade storage unit 70A. Incidentally, while a configuration of the blade storage unit 70A will be described in the following, the blade storage unit 70B is configured in a similar manner to the blade storage unit 70A.

The supporting member 76 has a front surface 76a and a back surface 76b substantially parallel with each other. The distal end portion of the rotary shaft 74 is fixed to the back surface 76b side of the supporting member 76. Then, a plurality of movable storage sections 78 that store cutting blades 50 are arranged on the front surface 76a side of the supporting member 76. Specifically, the supporting member 76 is provided with a plurality of circular openings 76c that penetrate the supporting member 76 in a thickness direction. The plurality of openings 76c are, for example, formed at substantially equal intervals along the circumferential direction of the supporting member 76. Then, disk-shaped supporting members 80 that are formed of a transparent material and support the cutting blades 50 are fitted into the openings 76c, and are fixed, within the openings 76c, to the supporting member 76.

Central portions of the supporting members 80 are each provided with a cylindrical boss portion (supporting shaft) 82 that projects from a front surface 80a of the supporting member 80. For example, the boss portion 82 is formed of the same transparent material as the supporting member 80 and is fixed to the central portion of the supporting member 80. The boss portion 82 is formed such that the diameter of the boss portion 82 corresponds to the diameter of the opening 52a (see FIG. 2) provided to the base 52 of the cutting blade 50. The boss portion 82 can therefore be inserted into the opening 52a of the base 52. When the boss portion 82 is inserted into the opening 52a of the base 52, the cutting blade 50 is supported by the front surface 80a of the supporting member 80 and the boss portion 82. Thus, the front surface 80a of the supporting member 80 and the boss portion 82 constitute a storage section 78.

In addition, each storage section 78 is provided with a first mark portion 84 indicating the position of the storage section 78. For example, the first mark portion 84 is a marker attached to a region of the front surface 80a side of the supporting member 80, the region being superposed on the boss portion 82 (bottom surface portion of the boss portion 82). FIG. 4 depicts the storage sections 78 provided with a cross-shaped mark as the first mark portion 84.

In addition, a camera (imaging unit) 86 that can photograph the first mark portion 84 is provided on the back surface 76b side of the supporting member 76. For example, the camera 86 is formed by a visible light camera including an imaging element that receives visible light and converts the visible light into an electric signal, an infrared camera including an imaging element that receives an infrared ray and converts the infrared ray into an electric signal, or the like. The camera 86 is fixed to a side surface of the supporting structure 72. The camera 86 is disposed in a position superposed on the supporting member 76 in the Y-axis direction. The camera 86 photographs a storage section 78 positioned at a position opposed to the camera 86. When the camera 86 photographs the storage section 78, the first mark portion 84 is also photographed via the transparent supporting member 80, and an image displaying the first mark portion 84 is obtained. In addition, when the supporting member 76 is rotated, the storage section 78 is moved along the circumferential direction of the supporting member 76, so that the storage section 78 opposed to the camera 86 is changed. The storage section 78 to be photographed by the camera 86 is thereby selected.

The material of the supporting member 80 is selected as appropriate according to the kind of the camera 86. For example, in a case where the camera 86 is a visible light camera, the supporting member 80 is formed by a member that transmits visible light. Concrete examples of the material of the supporting member 80 include plastic, glass (quartz glass, borosilicate glass, or the like), and the like. In addition, the same material as that of the supporting member 80 can be used also for the boss portion 82.

It is to be noted that there are no limitations on the kind and shape of the first mark portion 84 as long as the camera 86 can photograph the first mark portion 84. For example, the first mark portion 84 is provided by coloring or processing the front surface 80a side of the supporting member 80. In addition, instead of providing the first mark portion 84 anew, the structure of the storage section 78 itself (for example, the contour of the opening 76c, the contour of the supporting member 80, the contour of the boss portion 82, or the like) may be used as the first mark portion 84. In addition, there is no limitation on the position of the first mark portion 84 either as long as the camera 86 can photograph the first mark portion 84. For example, the first mark portion 84 may be provided on the back side (camera 86 side) of the supporting member 80. However, the first mark portion 84 is preferably provided on the front surface 80a side of the supporting member 80 (bottom surface portion of the boss portion 82) because foreign matter does not easily adhere to the first mark portion 84 and the first mark portion 84 is not easily removed when the first mark portion 84 is provided on the front surface 80a side of the supporting member 80. Further, instead of providing the openings 76c and the supporting members 80 to the supporting member 76, the supporting member 76 itself may be formed by a transparent member made of a plastic, a glass, or the like. In this case, a plurality of boss portions 82 projecting from the front surface 76a of the supporting member 76 are provided, and the front surface 76a of the supporting member 76 and the boss portions 82 constitute storage sections 78. Then, first mark portions 84 are provided on the front surface 76a side or the back surface 76b side of the supporting member 76.

As depicted in FIG. 3, the blade storage units 70A and 70B are arranged in a state of being separated from each other such that the front surface 76a of the supporting member 76 of the blade storage unit 70A and the front surface 76a of the supporting member 76 of the blade storage unit 70B face each other. Then, a transporting unit (transporting mechanism) 88 that holds and transports cutting blades 50 is provided between the blade storage units 70A and 70B as viewed from the front.

The transporting unit 88 includes a moving mechanism 90 that moves an attaching and detaching unit (attaching and detaching mechanism) 98 to be described later. The moving mechanism 90 includes a plate-shaped base 90a disposed substantially in parallel with the X-axis direction and the Y-axis direction. The base 90a is, for example, disposed in the rear of the second supporting structure 34 (see FIG. 1).

A ball screw 92 disposed along the X-axis direction is fixed to the lower surface side of the base 90a. In addition, a rectangular parallelepipedic moving block 94 is screwed onto the ball screw 92, and a supporting member 96 formed in a U-shaped shape as viewed from the side is fixed to the lower surface side of the moving block 94. The supporting member 96 supports the attaching and detaching unit 98 that attaches and detaches cutting blades 50 and nuts 56 (see FIG. 2). The moving mechanism 90 has a pulse motor (not depicted) connected to an end portion of the ball screw 92. When the pulse motor rotates the ball screw 92, the attaching and detaching unit 98 supported by the supporting member 96 moves in the X-axis direction along the ball screw 92. A position in the X-axis direction of the attaching and detaching unit 98 is thereby controlled. The moving mechanism 90 also includes a ball screw type Y-axis moving mechanism (not depicted) that moves the base 90a along the Y-axis direction. The Y-axis moving mechanism controls a position in the Y-axis direction of the attaching and detaching unit 98.

Figure 5:
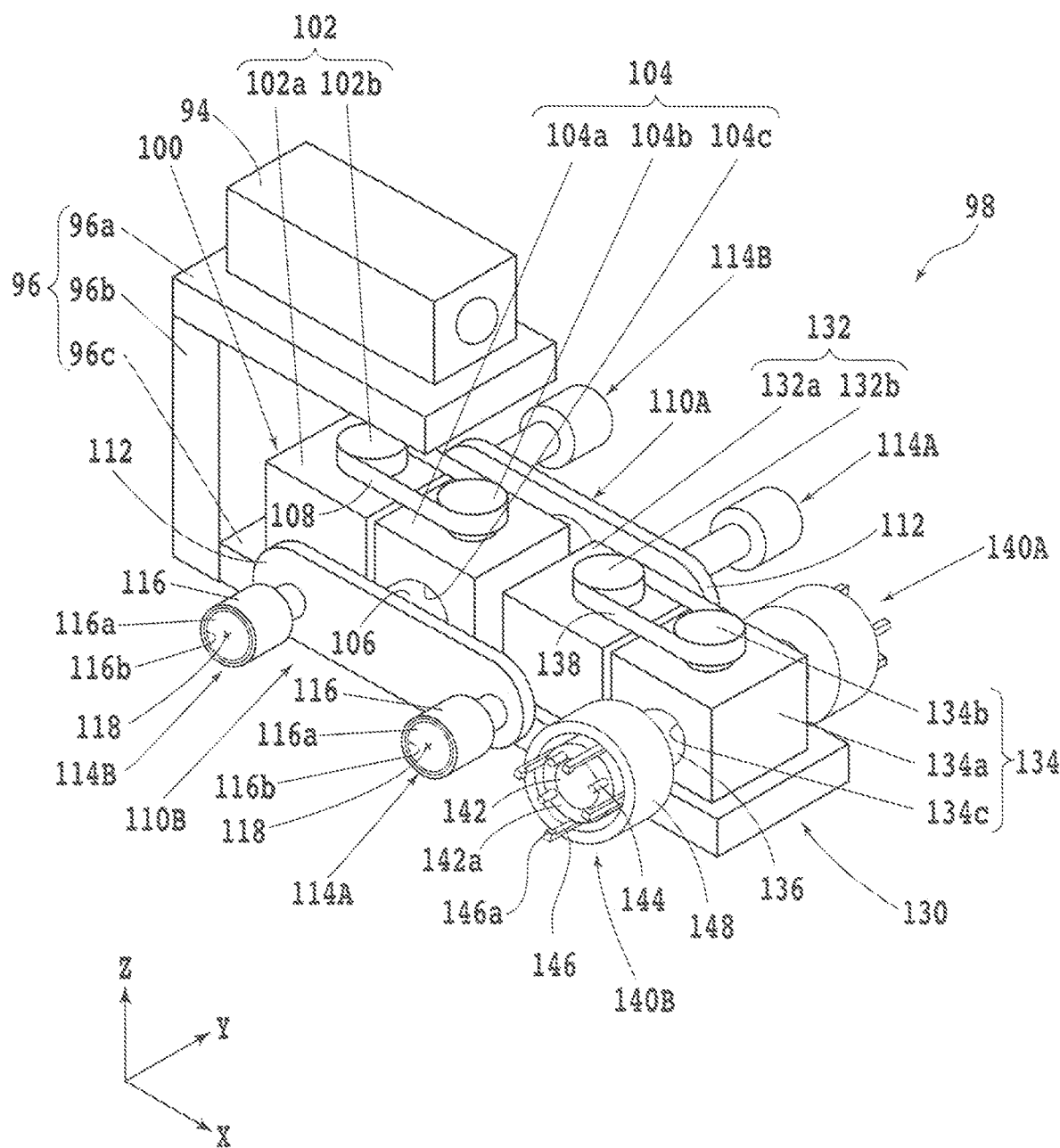
FIG. 5 is a perspective view depicting a transporting unit.

FIG. 5 is a perspective view depicting the attaching and detaching unit 98. The supporting member 96 supporting the attaching and detaching unit 98 includes a plate-shaped upper wall portion 96a fixed to the lower surface side of the moving block 94, a columnar side wall portion 96b that projects downward from an end portion on the rear side of the upper wall portion 96a, and a plate-shaped supporting portion 96c that projects from a lower end portion of the side wall portion 96b to a front side, and is disposed substantially in parallel with the upper wall portion 96a. The attaching and detaching unit 98 is supported by the supporting portion 96c of the supporting member 96.

The attaching and detaching unit 98 includes a blade attaching and detaching unit 100 that attaches and detaches cutting blades 50 and a nut attaching and detaching unit 130 that attaches and detaches nuts 56 (see FIG. 2) for fixing the cutting blades 50. The blade attaching and detaching unit 100 and the nut attaching and detaching unit 130 are fixed onto the supporting portion 96c of the supporting member 96.

The blade attaching and detaching unit 100 includes a motor 102 constituting a rotational driving source and a power transmitting mechanism 104 connected to the motor 102. The motor 102 and the power transmitting mechanism 104 are arranged along the X-axis direction so as to be adjacent to each other. The motor 102 includes a casing 102a formed in a hollow cubic shape and housing constituent elements such as a rotor and a stator and a rotary shaft connected to the rotor and disposed along the Z-axis direction. A distal end portion of the rotary shaft of the motor 102 is exposed from the upper surface of the casing 102a. A disk-shaped pulley 102b is fixed to the distal end portion of the rotary shaft. The power transmitting mechanism 104 includes a casing 104a formed in a hollow cubic shape and a rotary shaft housed in the casing 104a and disposed along the Z-axis direction. A distal end portion of the rotary shaft of the power transmitting mechanism 104 is exposed from the upper surface of the casing 104a. A disk-shaped pulley 104b is fixed to the distal end portion of the rotary shaft.

A through hole 104c that penetrates the casing 104a in the left-right direction (Y-axis direction) is formed in the casing 104a. A cylindrical shaft 106 is inserted in the through hole 104c so as to penetrate the casing 104a. Both end portions of the shaft 106 are exposed from both side surfaces of the casing 104a. The shaft 106 is held in a state of being rotatable about a rotational axis substantially parallel with the Y-axis direction and is coupled, within the casing 104a, to the rotary shaft of the power transmitting mechanism 104. Specifically, the casing 104a is internally provided with a converting mechanism that converts a rotational power of the rotary shaft of the power transmitting mechanism 104, the rotary shaft being disposed along the Z-axis direction, into a rotational power of the shaft 106 disposed along the Y-axis. The converting mechanism is, for example, formed by a bevel gear (a spiral bevel gear, a straight bevel gear, or the like) or a hypoid gear.

The motor 102 and the power transmitting mechanism 104 are coupled to each other by an annular coupling member 108 formed of a belt, a chain, or the like. Specifically, the coupling member 108 is wound in an oblong shape as viewed in plan so as to be in contact with the side surface of the pulley 102b of the motor 102 and the side surface of the pulley 104b of the power transmitting mechanism 104. When power is supplied to the motor 102, the power of the motor 102 is transmitted to the rotary shaft of the power transmitting mechanism 104 via the pulley 102b, the coupling member 108, and the pulley 104b. In addition, the converting mechanism provided within the casing 104a transmits the power of the rotary shaft of the power transmitting mechanism 104 to the shaft 106, so that the shaft 106 is rotated. The power transmitting mechanism 104 thus transmits the power of the motor 102 to the shaft 106.

A blade holding unit 110A that holds the cutting blade 50 fitted to the cutting unit 38A (see FIG. 1) and a cutting blade 50 to be newly fitted to the cutting unit 38A is fixed to one end side of the shaft 106. In addition, a blade holding unit 110B that holds the cutting blade 50 fitted to the cutting unit 38B (see FIG. 1) and a cutting blade 50 to be newly fitted to the cutting unit 38B is fixed to another end side of the shaft 106.

The blade holding units 110A and 110B each include a plate-shaped supporting member 112 formed in an oblong shape as viewed from the side and fixed to a distal end portion of the shaft 106 and blade suction units 114A and 114B provided on a surface side of the supporting member 112, the surface side facing an opposite side from the power transmitting mechanism 104. The blade suction unit 114A is fixed to one end side of the supporting member 112. The blade suction unit 114B is fixed to another end side of the supporting member 112.

The blade suction units 114A and 114B each include a cylindrical holding unit (sucking and holding portion) 116 fixed to the supporting member 112. A surface of the holding unit 116, the surface facing the opposite side from the power transmitting mechanism 104, constitutes a circular holding surface 116a that holds the cutting blade 50. On the holding surface 116a side of an outer circumferential portion of the holding unit 116, an annular groove (recessed portion) 116b is formed along an outer circumferential edge of the holding unit 116. The groove 116b is connected to a suction source (not depicted) such as an ejector via a flow passage (not depicted) formed inside the holding unit 116, a valve (not depicted), and the like. When a negative pressure of the suction source is made to act on the groove 116b in a state in which the holding surface 116a of the holding unit 116 is held in contact with the protruding portion 52b (see FIG. 2) of the base 52 of the cutting blade 50, the cutting blade 50 is sucked and held by the holding unit 116.

In addition, the holding unit 116 is provided with a second mark portion 118 that indicates the position of the holding unit 116. The second mark portion 118 is, for example, a marker that is attached to a center on the holding surface 116a side of the holding unit 116 and which can be photographed by the camera 86 (see FIG. 4). FIG. 5 depicts holding units 116 provided with a cross-shaped mark as the second mark portion 118. Incidentally, there are no limitations on the kind, shape, position, and the like of the second mark portion 118 as long as the camera 86 can photograph the second mark portion 118. For example, the second mark portion 118 is provided by coloring or processing the holding surface 116a side of the holding unit 116. In addition, instead of providing the second mark portion 118 anew, the structure of the holding unit 116 itself (for example, the groove 116b or the like) may be used as the second mark portion 118. Further, the second mark portion 118 may be attached at a position displaced by a predetermined distance from the center on the holding surface 116a side of the holding unit 116.

When the cutting blades 50 fitted to the cutting units 38A and 38B are replaced, the blade holding units 110A and 110B attach and detach the cutting blades 50. Incidentally, concrete operation of the blade holding units 110A and 110B at a time of the replacement of the cutting blades 50 will be described later.

The nut attaching and detaching unit 130 is provided in front of the blade attaching and detaching unit 100. The nut attaching and detaching unit 130 includes a motor 132 constituting a rotational driving source and a power transmitting mechanism 134 connected to the motor 132. The motor 132 and the power transmitting mechanism 134 are arranged along the X-axis direction so as to be adjacent to each other.

Configurations of the motor 132 and the power transmitting mechanism 134 are each similar to those of the motor 102 and the power transmitting mechanism 104 of the blade attaching and detaching unit 100. Specifically, the motor 132 includes a casing 132a and a pulley 132b fixed to a distal end portion of a rotary shaft of the motor 132. In addition, the power transmitting mechanism 134 includes a casing 134a and a pulley 134b fixed to a distal end portion of a rotary shaft of the power transmitting mechanism 134. A through hole 134c that penetrates the casing 134a in the left-right direction (Y-axis direction) is formed in the casing 134a. A cylindrical shaft 136 is inserted in the through hole 134c so as to penetrate the casing 134a. Both end portions of the shaft 136 are exposed from both side surfaces of the casing 134a. The shaft 136 is held in a state of being rotatable about a rotational axis substantially parallel with the Y-axis direction and is coupled, within the casing 134a, to the rotary shaft of the power transmitting mechanism 134.

The motor 132 and the power transmitting mechanism 134 are coupled to each other by an annular coupling member 138 formed of a belt, a chain, or the like. Specifically, the coupling member 138 is wound in an oblong shape as viewed in plan so as to be in contact with the side surface of the pulley 132b of the motor 132 and the side surface of the pulley 134b of the power transmitting mechanism 134. When power is supplied to the motor 132, the power of the motor 132 is transmitted to the rotary shaft of the power transmitting mechanism 134 via the pulley 132b, the coupling member 138, and the pulley 134b. In addition, a converting mechanism provided within the casing 134a transmits the power of the rotary shaft of the power transmitting mechanism 134 to the shaft 136, so that the shaft 136 is rotated. The power transmitting mechanism 134 thus transmits the power of the motor 132 to the shaft 136.

Fixed to one end side of the shaft 136 is a nut holding unit 140A that holds and rotates the nut 56 (see FIG. 2) for fixing the cutting blade 50 to the spindle 42 of the cutting unit 38A. In addition, fixed to another end side of the shaft 136 is a nut holding unit 140B that holds and rotates the nut 56 for fixing the cutting blade 50 to the spindle 42 of the cutting unit 38B.

The nut holding units 140A and 140B each include a cylindrical rotating member 142 fixed to a distal end portion of the shaft 136. The rotating member 142 is biased to an opposite side from the power transmitting mechanism 134 by a spring or the like and is configured to be movable along the Y-axis direction by application of an external force. In addition, the rotating member 142 has a front surface 142a that faces the opposite side from the power transmitting mechanism 134. The rotating member 142 is provided with four holding pins 144 that project from the front surface 142*a*. The holding pins 144 are formed so as to correspond to the position and size of the through holes 56*b* of the nut 56 (see FIG. 2). The holding pins 144 can therefore be inserted into the through holes 56*b*. Incidentally, the number of holding pins 144 is set as appropriate according to the number of through holes 56*b*. In addition, a plurality of gripping members 146 that grip the nut 56 are arranged on the periphery of the rotating member 142 at substantially equal intervals along the circumferential direction of the rotating member 142. The gripping members 146 are each formed in a columnar shape. Proximal end portions (one end side) of the gripping members 146 are fixed to the outer circumferential surface of the rotating member 142. FIG. 5 depicts an example in which four gripping members 146 that grip the outer circumferential surface of the nut 56 from four directions are provided. Distal end portions (another end side) of the gripping members 146 project from the front surface 142*a* of the rotating member 142. Pawl portions 146*a* bending toward the central side of the rotating member 142 are formed at the distal end portions. In addition, the gripping members 146 are biased outward in the radial direction of the rotating member 142 by a spring or the like and are configured such that the pawl portions 146*a* are movable along the radial direction of the rotating member 142. Further, a cover 148 formed in a hollow cylindrical shape is provided to the periphery of the rotating member 142. The rotating member 142 and the proximal end sides (power transmitting mechanism 134 side) of the gripping members 146 are housed within the cover 148.

When the rotating member 142 is pressed to the inside of the cover 148, the spring biasing the rotating member 142 is contracted, and the rotating member 142 is pushed to the inside of the cover 148 together with the plurality of gripping members 146. When the rotating member 142 is pushed to the inside of the cover 148, the distal end sides (pawl portion 146*a* side) of the plurality of gripping members 146 are brought into contact with and pressed by an inner wall of the cover 148, and the springs biasing the gripping members 146 are contracted. The distal end sides of the plurality of gripping members 146 thereby move inward in the radial direction of the rotating member 142. Then, the plurality of gripping members 146 are set in a state in which length directions thereof are arranged so as to be along the inner wall of the cover 148. At this time, the pawl portions 146*a* of the gripping members 146 are, for example, arranged more inward in the radial direction of the rotating member 142 than the outer circumferential edge of the rotating member 142 (closed state).

When the application of the external force to the rotating member 142 is released, on the other hand, the rotating member 142 moves to the outside of the cover 148, and the state in which the distal end sides of the gripping members 146 are pressed by the inner wall of the cover 148 is released. The distal end sides of the plurality of gripping members 146 thereby move outward in the radial direction of the rotating member 142. Then, the distal end sides of the plurality of gripping members 146 are arranged more outward in the radial direction of the rotating member 142 than in the closed state. At this time, the pawl portions 146*a* of the gripping members 146 are, for example, arranged more outward in the radial direction of the rotating member 142 than the outer circumferential edge of the rotating member 142 (opened state).

Each of the nut holding units 140A and 140B described above holds and rotates the nut 56. Specifically, first, the nut 56 comes into contact with the front surface 142*a* of the rotating member 142 such that the holding pins 144 of the rotating member 142 are inserted into the through holes 56*b* of the nut 56 (see FIG. 2). When the rotating member 142 is pushed in to the inside of the cover 148 in this state, the plurality of gripping members 146 are set in a closed state, and the pawl portions 146*a* come into contact with the outer circumferential surface of the nut 56, so that the nut 56 is gripped. When the motor 132 is driven in the state in which the nut 56 is held by the plurality of gripping members 146, the power of the motor 132 is transmitted to the shaft 136 via the power transmitting mechanism 134, and the shaft 136 is rotated. Thus, the rotating member 142 is rotated, and the nut 56 held by the gripping members 146 is also rotated. Fastening and detaching of the nuts 56 at a time of replacing the cutting blades 50 fitted to the cutting units 38A and 38B can be performed automatically by holding and rotating the nuts 56 by the nut holding units 140A and 140B. Incidentally, concrete operation of the nut attaching and detaching unit 130 at the time of replacing the cutting blades 50 will be described later.

The replacement of the cutting blades 50 fitted to the cutting units 38A and 38B (see FIG. 1) can be performed automatically by using the blade replacing apparatus 64 described above. A concrete example of operation of the blade replacing apparatus 64 at a time of replacing the cutting blades 50 will be described in the following. Incidentally, in the following, description will be made particularly of operation in a case of replacing the used cutting blade 50 fitted to the cutting unit 38A with a replacement cutting blade 50 stored by the blade storage unit 70A. However, similar description applies to operation in a case of replacing the used cutting blade 50 fitted to the cutting unit 38B with a replacement cutting blade 50 stored by the blade storage unit 70B.

Figure 6:
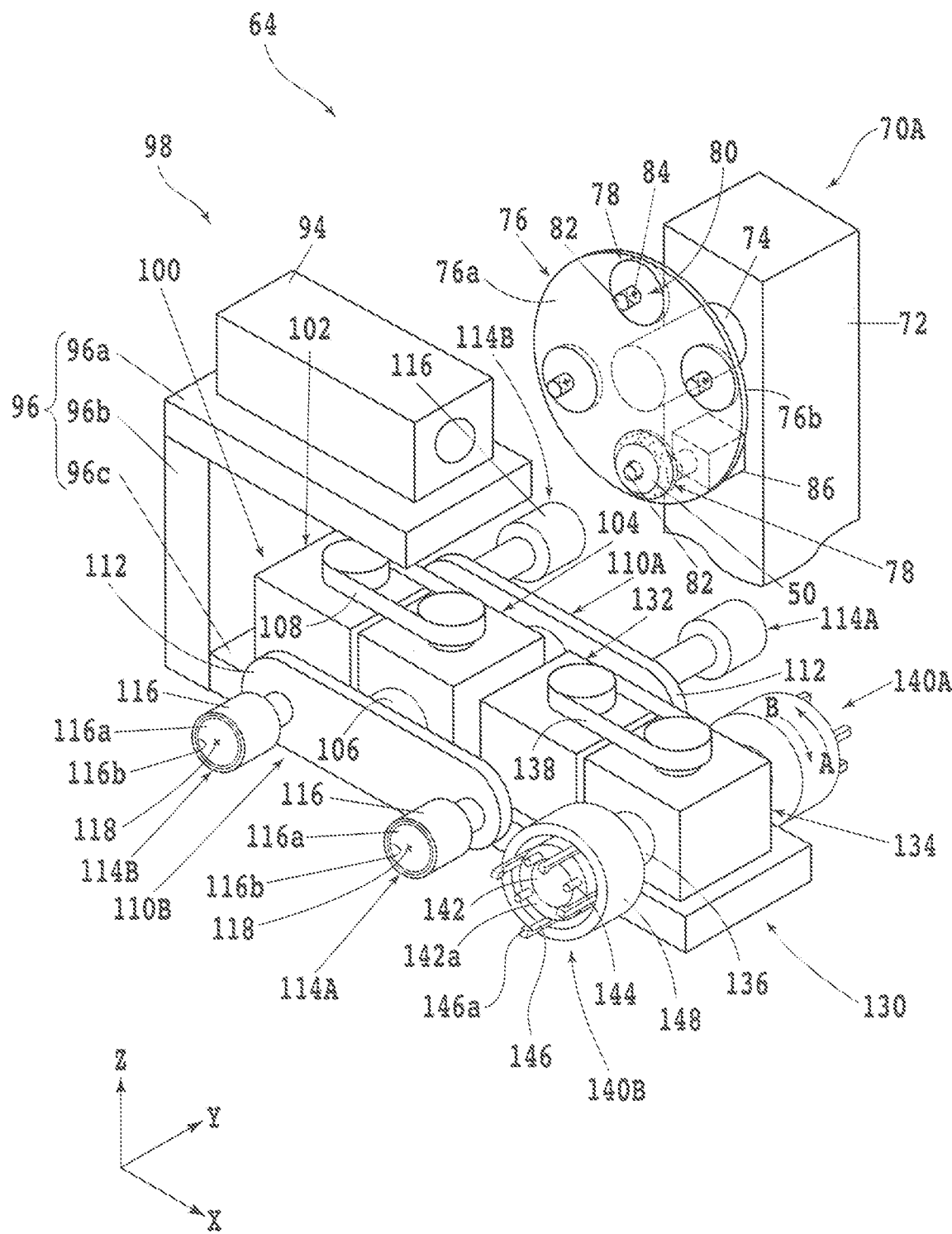
FIG. 6 is a perspective view depicting the blade replacing apparatus in a state in which the blade storage unit and a blade suction unit are opposed to each other.

First, the attaching and detaching unit 98 is moved by the moving mechanism 90 (see FIG. 3), and thereby the blade suction unit 114B included in the blade holding unit 110A is opposed to a replacement cutting blade 50 held by a storage section 78 of the blade storage unit 70A. FIG. 6 is a perspective view depicting the blade replacing apparatus 64 in a state in which the blade storage unit 70A and the blade suction unit 114B are opposed to each other. At this time, the storage section 78 of the blade storage unit 70A and the holding unit 116 of the blade suction unit 114B are aligned with each other. The alignment between the storage section 78 and the holding unit 116 is performed by adjusting the position of the storage section 78 by rotating the rotary shaft 74 of the blade storage unit 70A and adjusting the position of the attaching and detaching unit 98 (position of the blade suction unit 114B) by the moving mechanism 90 (see FIG. 3).

The control unit 66 (see FIG. 1) controls the positions of the storage sections 78 of the blade storage units 70A and 70B and the positions of the holding units 116 of the blade suction units 114A and 114B. For example, the control unit 66 includes a position registration section (position storage section) 66*a* in which the positions of the storage sections 78 of the blade storage units 70A and 70B and the positions of the holding units 116 of the blade suction units 114A and 114B are registered (stored). In addition, the control unit 66 includes an operation control section 66*b* that controls operation of the blade storage units 70A and 70B and the transporting unit 88. Functions of the position registration section 66*a* and the operation control section 66*b* are implemented by using a processor and a memory included in the control unit 66.

Registered in the position registration section 66*a* are the positions (designated positions) of storage sections 78 and holding units 116 at a time of attaching and detaching cutting blades 50 to and from the blade storage units 70A and 70B. For example, the positions of a storage section 78 and a holding unit 116 when the central position of the storage section 78 storing a cutting blade 50 and the central position of the holding unit 116 coincide with each other in the Y-axis direction are registered as designated positions in the position registration section 66a. The operation control section 66b reads the designated positions registered in the position registration section 66a and generates a control signal for arranging the storage section 78 and the holding unit 116 at the respective designated positions. This control signal controls the operation of the blade storage units 70A and 70B and the transporting unit 88, so that the storage section 78 and the holding unit 116 are arranged at the designated positions. As a result, the storage section 78 and the holding unit 116 are aligned with each other.

Thereafter, the moving mechanism 90 moves the blade suction unit 114B along the Y-axis direction to thereby make the holding unit 116 approach the storage section 78, and bring the holding surface 116a of the holding unit 116 into contact with the protruding portion 52b (see FIG. 2) of the base 52 of the replacement cutting blade 50 stored by the storage section 78. When a negative pressure of the suction source is made to act on the groove 116b of the holding unit 116 in this state, the replacement cutting blade 50 is sucked and held by the blade suction unit 114B.

Next, the moving mechanism 90 moves the attaching and detaching unit 98 along the X-axis direction through the lower sides of the first supporting structure 20 and the second supporting structure 34 (see FIG. 1) to dispose the attaching and detaching unit 98 at a position opposed to the cutting unit 38A. First, the attaching and detaching unit 98 is positioned such that the nut holding unit 140A is opposed to the mount 44 (see FIG. 2) of the cutting unit 38A. Incidentally, positional relation between the cutting unit 38A and the nut holding unit 140A is adjusted by the moving mechanism 36A and the moving mechanism 90 (see FIG. 1).

Thereafter, the moving mechanism 36A moves the cutting unit 38A to the nut holding unit 140A. Consequently, the nut 56 (see FIG. 2) fixing the cutting blade 50 fitted to the cutting unit 38A is pressed against the front surface 142a of the rotating member 142 included in the nut holding unit 140A. At this time, the plurality of holding pins 144 included in the nut holding unit 140A are inserted into the through holes 56b (see FIG. 2) of the nut 56. When the rotating member 142 is pressed by the nut 56, the rotating member 142 is pushed in to the inside of the cover 148, and the plurality of gripping members 146 are set in a closed state. The nut 56 is thereby gripped by the pawl portions 146a of the plurality of gripping members 146.

Next, the shaft 136 is rotated by the power of the motor 132, and thereby the nut holding unit 140A is rotated in a first direction (for example, a direction indicated by an arrow A). Consequently, the nut 56 gripped by the nut holding unit 140A is rotated and loosened and is detached from the supporting shaft 48 of the mount 44 (see FIG. 2).

Thereafter, the cutting unit 38A is moved along the Y-axis direction, and thereby the cutting unit 38A and the nut holding unit 140A are separated from each other. Incidentally, the nut holding unit 140A is configured to be able to maintain a state in which the rotating member 142 is pushed in to the inside of the cover 148. The nut 56 is therefore held by the nut holding unit 140A also after being detached from the supporting shaft 48.

Next, the moving mechanism 90 moves the attaching and detaching unit 98 to oppose the blade suction unit 114A of the blade holding unit 110A to the used cutting blade 50 fitted to the cutting unit 38A. Then, the moving mechanism 36A moves the cutting unit 38A to the blade suction unit 114A to bring the holding surface 116a of the holding unit 116 of the blade suction unit 114A into contact with the protruding portion 52b (see FIG. 2) of the base 52 of the used cutting blade 50. When a negative pressure of the suction source is made to act on the groove 116b of the holding unit 116 in this state, the used cutting blade 50 is sucked and held by the blade suction unit 114A. Thereafter, the cutting unit 38A is moved along the Y-axis direction, and thereby the cutting unit 38A and the blade suction unit 114A are separated from each other. Consequently, the used cutting blade 50 is detached from the cutting unit 38A.

Next, the shaft 106 is rotated by 180° by the power of the motor 102. Consequently, the supporting member 112 is rotated, and the position of the blade suction unit 114A and the position of the blade suction unit 114B are interchanged. As a result, the blade suction unit 114B holding the replacement cutting blade 50 is opposed to the mount 44 of the cutting unit 38A.

Thereafter, the moving mechanism 36A moves the cutting unit 38A toward the blade suction unit 114B, and thereby makes the cutting unit 38A and the blade suction unit 114B approach each other. Consequently, the supporting shaft 48 (see FIG. 2) of the mount 44 is inserted into the opening 52a (see FIG. 2) of the replacement cutting blade 50 held by the blade suction unit 114B. When the suction of the replacement cutting blade 50 by the blade suction unit 114B is released in this state, the replacement cutting blade 50 is mounted on the distal end portion of the spindle 42. Then, the cutting unit 38A is moved along the Y-axis direction, and thereby the cutting unit 38A and the blade suction unit 114B are separated from each other.

Next, the moving mechanism 90 moves the attaching and detaching unit 98, and thereby the nut holding unit 140A in a state of holding the nut 56 (see FIG. 2) is positioned so as to be opposed to the mount 44 (see FIG. 2) of the cutting unit 38A. Then, the moving mechanism 36A moves the cutting unit 38A to the nut holding unit 140A. Consequently, the nut 56 held by the nut holding unit 140A is positioned at the distal end portion of the supporting shaft 48 of the mount 44. In this state, the shaft 136 is rotated by the power of the motor 132, and thereby the nut holding unit 140A is rotated in a second direction (for example, a direction indicated by an arrow B) opposite from the first direction. Consequently, the nut 56 is rotated and fastened to the threaded portion 48a formed on the supporting shaft 48 of the mount 44 (see FIG. 2). As a result, the replacement cutting blade 50 is sandwiched by the front end surface 46c (see FIG. 2) of the protruding portion 46b of the mount 44 and the nut 56, and is thus fixed to the cutting unit 38A.

Thereafter, the cutting unit 38A is moved along the Y-axis direction, and thereby the cutting unit 38A and the nut holding unit 140A are separated from each other. At this time, the rotating member 142 moves to the outside of the cover 148, and the plurality of gripping members 146 are set in an opened state. The gripping of the nut 56 by the plurality of gripping members 146 is thereby released.

Next, the moving mechanism 90 moves the attaching and detaching unit 98 along the Y-axis direction to oppose the blade suction unit 114A holding the used cutting blade 50 to a storage section 78 of the blade storage unit 70A. At this time, alignment between the storage section 78 of the blade storage unit 70A and the holding unit 116 of the blade suction unit 114A is performed. Incidentally, a method of the alignment is similar to the above-described method of aligning the storage section 78 of the blade storage unit 70A and the holding unit 116 of the blade suction unit 114B with each other. Then, the boss portion 82 of the storage section 78 is inserted into the opening 52a (see FIG. 2) of the used cutting blade 50 held by the blade suction unit 114A. The used cutting blade 50 is thereby held and stored by the storage section 78. Thus, the moving mechanism 90 moves the holding units 116 of the blade suction units 114A and 114B holding the cutting blades 50 between the storage sections 78 of the blade storage unit 70A and the spindle 42, and the replacement of the cutting blades 50 by the blade replacing apparatus 64 is performed.

The above-described method of replacing the cutting blades 50 aligns the blade storage units 70A and 70B and the blade suction units 114A and 114B with each other on the basis of the designated positions registered in advance in the position registration section 66a (see FIG. 1) of the control unit 66. However, for various reasons (for example, secular degradations of the blade storage units 70A and 70B, the moving mechanism 90, and the attaching and detaching unit 98 or the like), a displacement may occur in the positional relation between the storage sections 78 and the holding units 116 even when the storage sections 78 of the blade storage units 70A and 70B and the holding units 116 of the blade suction units 114A and 114B are arranged at the respective designated positions.

Accordingly, the present embodiment checks the positional relation between the storage sections 78 and the holding units 116 by using the first mark portions 84 provided to the storage sections 78 of the blade storage units 70A and 70B and the second mark portions 118 provided to the holding units 116 of the blade suction units 114A and 114B, and updates the designated positions registered in the position registration section 66a. Accuracy of alignment between the blade storage units 70A and 70B and the blade suction units 114A and 114B can be maintained by periodically performing this process in predetermined timing (for example, at a time of maintenance of the blade replacing apparatus 64).

A concrete example of an adjusting method of the blade replacing apparatus according to the present embodiment will be described in the following.

Incidentally, in the following, description will be made of, as an example, a procedure in a case of adjusting positional relation between a storage section 78 of the blade storage unit 70A and the holding unit 116 of the blade suction unit 114A included in the blade holding unit 110A. However, the following procedure can be applied to alignment between any storage section 78 and any holding unit 116.

Figure 7:
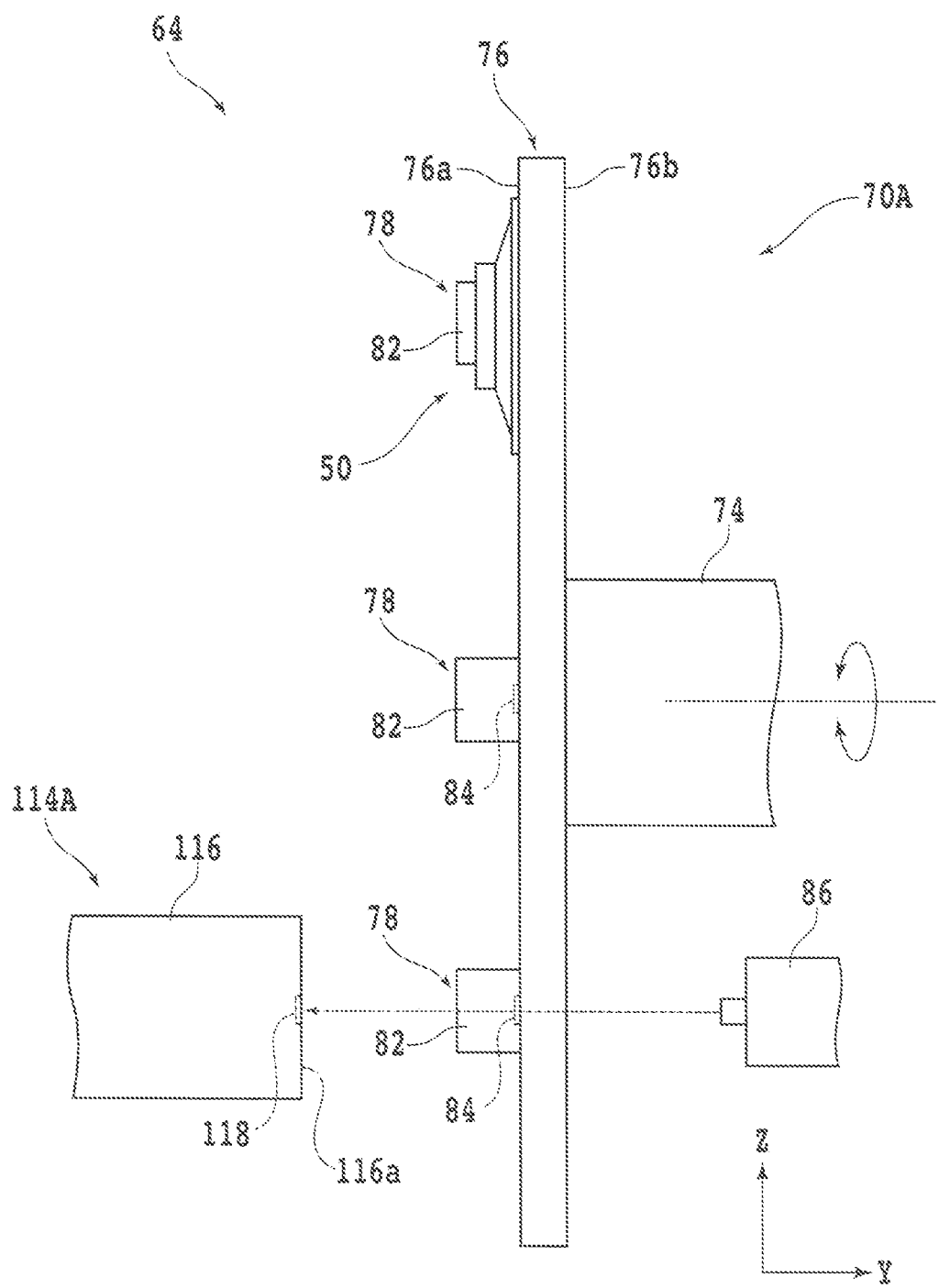
FIG. 7 is a front view depicting the blade replacing apparatus in a registering step.

First, the positions of the storage section 78 and the holding unit 116 when the storage section 78 of the blade storage unit 70A and the holding unit 116 of the blade suction unit 114A are arranged in a predetermined positional relation are registered as designated positions in the position registration section 66a of the control unit 66 (registering step). FIG. 7 is a front view depicting the blade replacing apparatus 64 in the registering step.

In the registering step, first, the moving mechanism 90 (see FIG. 3) moves the attaching and detaching unit 98 to oppose the blade suction unit 114A of the blade holding unit 110A to the storage section 78 of the blade storage unit 70A. At this time, when the storage section 78 opposed to the blade suction unit 114A stores a cutting blade 50, the blade suction unit 114A is disposed at a position desirable for the cutting blade 50 to be appropriately held by the blade suction unit 114A. For example, the blade suction unit 114A is disposed such that the central position of the holding unit 116 coincides with the central position of the storage section 78 in the Y-axis direction.

Next, the camera 86 photographs the storage section 78. When the camera 86 photographs the storage section 78 from the back surface 76b side of the supporting member 76, the holding unit 116 of the blade suction unit 114A is also photographed at the same time through the transparent supporting member 80 (see FIG. 6) and the transparent boss portion 82. As a result, an image which includes the first mark portion 84 attached to the front surface 80a side of the supporting member 80 (bottom surface portion of the boss portion 82) and the second mark portion 118 attached to the holding unit 116 is obtained.

Figure 8A:
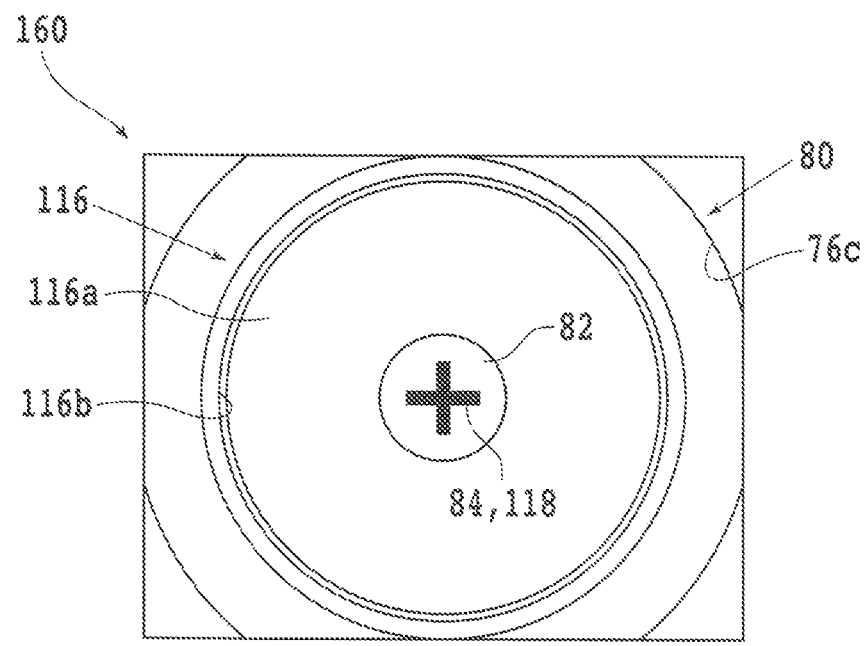
FIG. 8A is an image diagram depicting an image obtained in the registering step.

FIG. 8A is an image diagram depicting an image 160 obtained in the registering step. When the camera 86 performs photographing in a state in which the central position of the storage section 78 and the central position of the holding unit 116 coincide with each other in the Y-axis direction, the image 160 in a state in which the first mark portion 84 and the second mark portion 118 coincide with each other is obtained, as depicted in FIG. 8A. Then, the positions of the storage section 78 and the holding unit 116 (designated positions) in the state in which the first mark portion 84 and the second mark portion 118 coincide with each other are registered in the position registration section 66a (see FIG. 1) of the control unit 66. Registered as the designated position of the storage section 78 is, for example, a rotational angle of the rotary shaft 74 (rotational angle of the supporting member 76 or 80), central coordinates of the boss portion 82, or the like. In addition, registered as the designated position of the holding unit 116 is, for example, central coordinates of the holding unit 116, a state of the moving mechanism 90 (see FIG. 3) (coordinates of the moving block 94, the number of rotations of the ball screw 92, or the like), or the like.

Figure 8B:
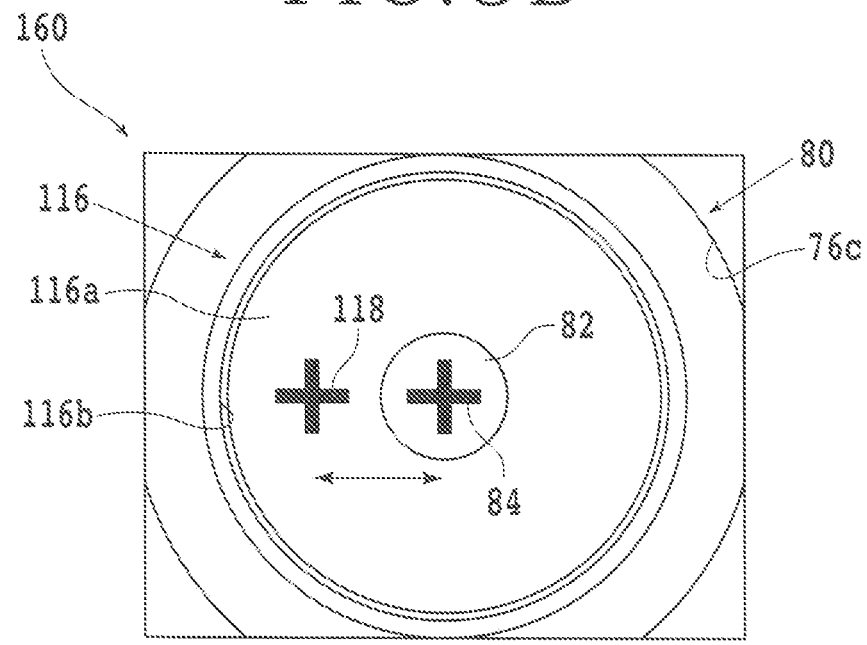
FIG. 8B is an image diagram depicting an image including a first mark portion and a second mark portion not coinciding with each other.

Incidentally, the first mark portion 84 may be provided at a position displaced from the center of the storage section 78, and the second mark portion 118 may be provided at a position displaced from the center of the holding unit 116. For example, in a case where the boss portion 82 has low transparency and it is thus difficult for the camera 86 to photograph the holding unit 116 through the boss portion 82, the second mark portion 118 is attached to a position separated from the center of the holding unit 116 by a predetermined distance (equal to or more than the radius of the boss portion 82). In this case, an image 160 in a state in which the first mark portion 84 and the second mark portion 118 do not coincide with each other is obtained. FIG. 8B is an image diagram depicting the image 160 including the first mark portion 84 and the second mark portion 118 not coinciding with each other. In a case where the position of the second mark portion 118 is displaced from the center of the holding unit 116, the first mark portion 84 and the second mark portion 118 are displayed at positions separated from each other by a predetermined distance in the image 160.

As described above, the positions of the storage section 78 and the holding unit 116 when the first mark portion 84 and the second mark portion 118 are arranged in predetermined positional relation are registered as the designated positions in the position registration section 66a. Then, the replacement of the cutting blade 50 by the blade replacing apparatus 64 is performed using the designated positions.

At a time of replacement of the cutting blade 50, the storage section 78 and the holding unit 116 are arranged at the designated positions registered in the position registration section 66a, and thereby the storage section 78 and the holding unit 116 are aligned with each other. Incidentally, concrete operation of the blade replacing apparatus 64 at the time of replacement of the cutting blade 50 is as described earlier.

Then, after the blade replacing apparatus 64 is used for a certain period, maintenance of the blade replacing apparatus 64 is performed. At this time, the storage section 78 and the holding unit 116 are moved so as to be arranged at the designated positions registered in the position registration section 66a, and whether or not the first mark portion 84 and the second mark portion 118 are arranged in predetermined positional relation is determined (determining step).

In the determining step, first, the operation control section 66b controls operation of the blade storage unit 70A and the moving mechanism 90 (see FIG. 3) such that the storage section 78 of the blade storage unit 70A and the holding unit 116 of the blade suction unit 114A are arranged at the designated positions registered in the position registration section 66a. Then, as in the registering step, the camera 86 photographs the storage section 78. Consequently, an image including the first mark portion 84 and the second mark portion 118 is obtained. Here, even when the storage section 78 and the holding unit 116 are controlled so as to be arranged at the designated positions registered in the position registration section 66a, a displacement may occur in the positional relation between the storage section 78 and the holding unit 116, that is, the positional relation between the first mark portion 84 and the second mark portion 118 for reasons of secular degradations or the like. Accordingly, the determining step determines whether or not the first mark portion 84 and the second mark portion 118 are arranged in predetermined positional relation (positional relation between the first mark portion 84 and the second mark portion 118 in the registering step).

Figure 9A:
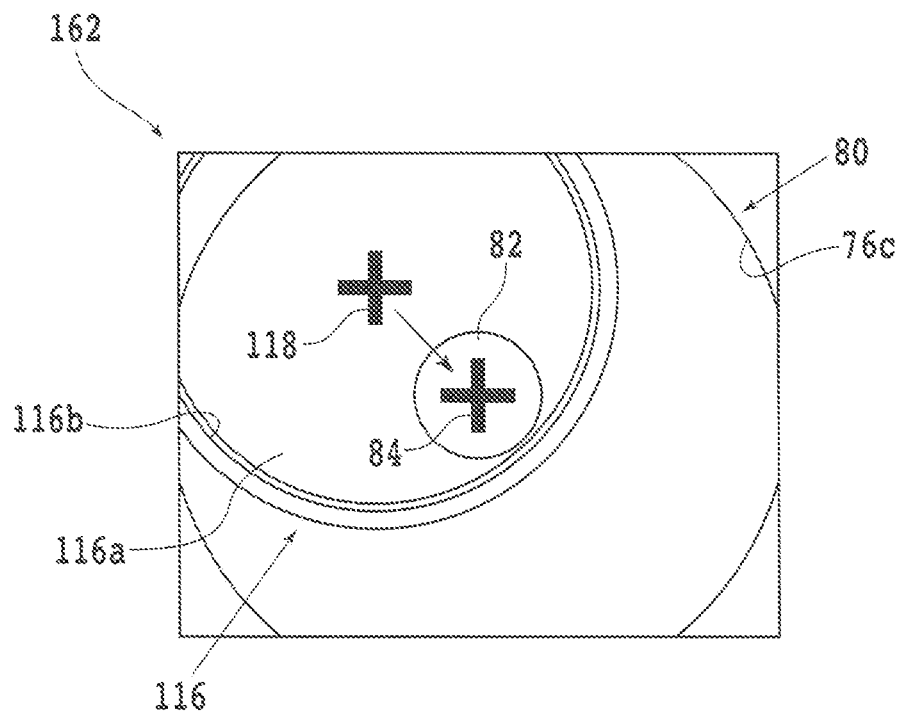
FIG. 9A is an image diagram depicting an image obtained in a determining step.

FIG. 9A is an image diagram depicting an image 162 obtained in the determining step. The image 162 displays the first mark portion 84 and the second mark portion 118 at different positions. In this case, it is determined that the first mark portion 84 and the second mark portion 118 are not arranged in the predetermined positional relation, and that a displacement has occurred in the positional relation between the first mark portion 84 and the second mark portion 118. The above-described determination is, for example, made by image processing such as pattern matching. Specifically, a reference image of a state in which the first mark portion 84 and the second mark portion 118 are in desired positional relation (see FIG. 8A and FIG. 8B) is obtained in advance and is stored in the control unit 66. Then, the control unit 66 determines whether or not the first mark portion 84 and the second mark portion 118 are in the predetermined positional relation by comparing the image 162 obtained by the camera 86 in the determining step with the reference image. However, there is no limitation on a method of the determination. For example, the image 162 obtained by photographing by the camera 86 may be displayed on a touch panel (not depicted) provided to the cutting apparatus 2, and the operator may refer to the image 162 displayed on the touch panel and determine whether or not the first mark portion 84 and the second mark portion 118 are arranged in the predetermined positional relation.

Figure 9B:
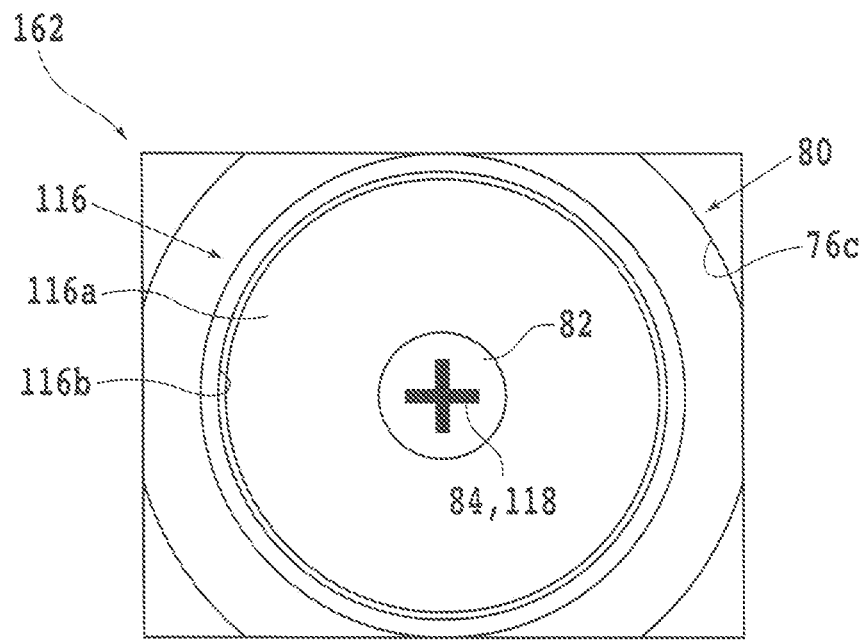
FIG. 9B is an image diagram depicting an image including the first mark portion and the second mark portion arranged in predetermined positional relation.

When it is determined in the determining step that the first mark portion 84 and the second mark portion 118 are not arranged in the predetermined positional relation, the positions of the storage section 78 and the holding unit 116 are adjusted such that the first mark portion 84 and the second mark portion 118 are arranged in the predetermined positional relation. For example, the positions of the storage section 78 and the holding unit 116 are adjusted by the operator who changes the position of the storage section 78 or the holding unit 116 by operating the touch panel while referring to the image 162 displayed on the touch panel (not depicted). When photographing is then performed by the camera 86 again after the positions of the storage section 78 and the holding unit 116 are adjusted, an image 162 of a state in which the first mark portion 84 and the second mark portion 118 are arranged in the predetermined positional relation is obtained. FIG. 9B is an image diagram depicting the image 162 including the first mark portion 84 and the second mark portion 118 arranged in the predetermined positional relation.

Then, the positions of the storage section 78 and the holding unit 116 in the state in which the first mark portion 84 and the second mark portion 118 are arranged in the predetermined positional relation are registered as designated positions in the position registration section 66a. Consequently, the designated positions registered in the position registration section 66a in the registering step are overwritten with the newly obtained designated positions (overwriting step). When the overwriting step is performed, the designated positions for arranging the storage section 78 and the holding unit 116 in the desired positional relation are updated. Thereafter, the blade replacing apparatus 64 is operated again, and the replacement of the cutting blade 50 is resumed in a state in which the storage section 78 and the holding unit 116 are arranged properly.

As described above, the blade replacing apparatus 64 according to the present embodiment includes the storage section 78 provided with the first mark portion 84 that can be photographed by the camera 86 and the holding unit 116 provided with the second mark portion 118 that can be photographed by the camera 86. It is thereby possible to determine whether or not the first mark portion 84 and the second mark portion 118 are arranged in the predetermined positional relation on the basis of the image 162 obtained by the camera 86, and thus check whether or not the positional relation between the storage section 78 and the holding unit 116 is proper. Then, when it is determined that the first mark portion 84 and the second mark portion 118 are not arranged in the predetermined positional relation, the positional relation between the storage section 78 and the holding unit 116 is adjusted, and the positions of the storage section 78 and the holding unit 116 when the positional relation between the storage section 78 and the holding unit 116 is adjusted can be overwritten as designated positions in the position registration section 66a. Thus, the appropriate positional relation between the storage section 78 and the holding unit 116 is periodically updated, and a state in which the holding unit 116 can appropriately hold the cutting blade 50 stored in the storage section 78 is maintained.

Figure 10:
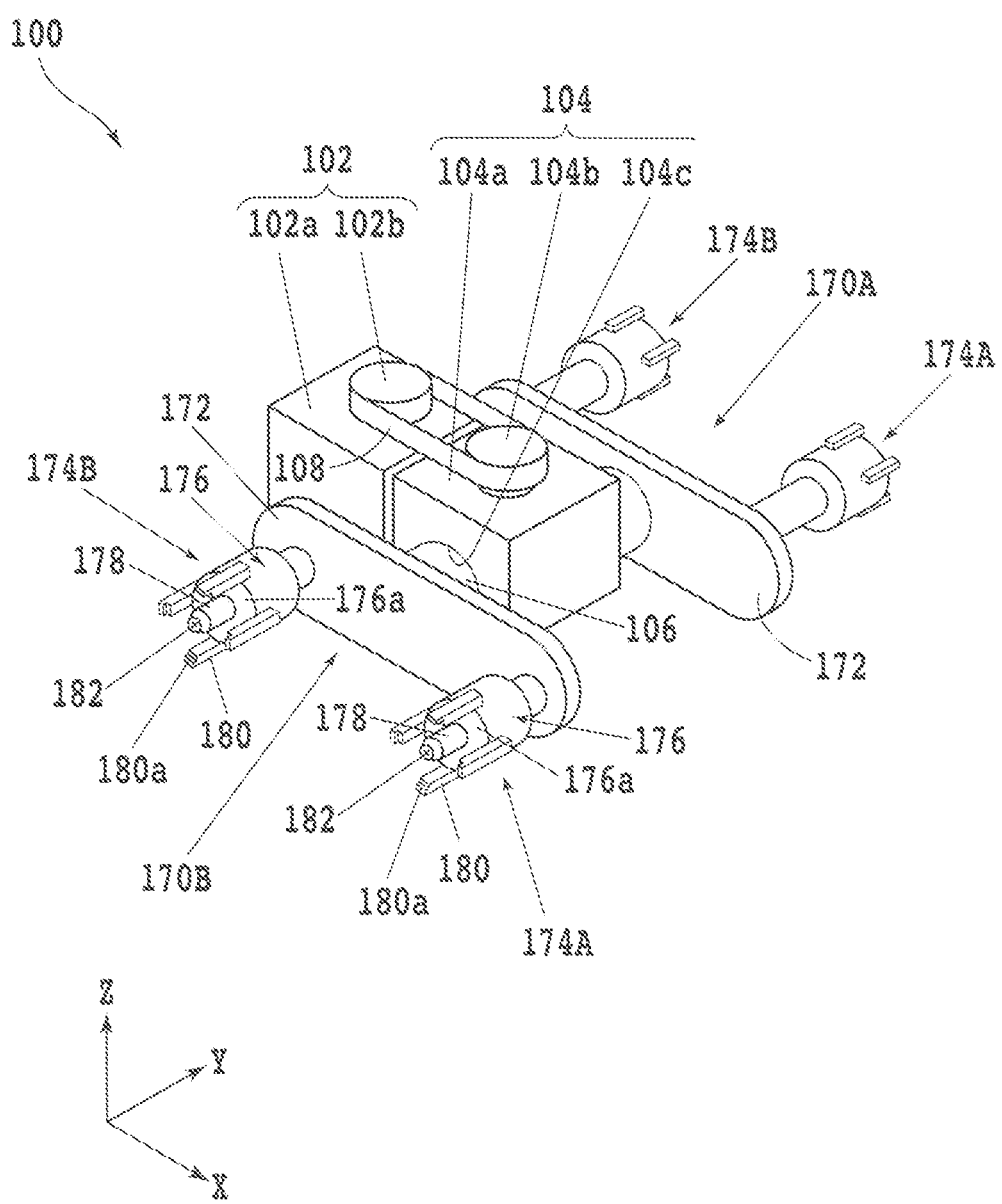
FIG. 10 is a perspective view depicting a blade attaching and detaching unit.

It is to be noted that the configuration of the blade replacing apparatus 64 can be changed as appropriate insofar as cutting blades 50 can be replaced. For example, the blade attaching and detaching unit 100 included in the blade replacing apparatus 64 may include a pair of blade holding units that grip cutting blades 50. FIG. 10 is a perspective view depicting the blade attaching and detaching unit 100. The blade attaching and detaching unit 100 depicted in FIG. 10 includes blade holding units 170A and 170B in place of the blade holding units 110A and 110B depicted in FIG. 5.

The blade holding unit 170A that holds the cutting blade 50 fitted to the cutting unit 38A (see FIG. 1) and a cutting blade 50 to be newly fitted to the cutting unit 38A is fixed to one end side of the shaft 106. In addition, the blade holding unit 170B that holds the cutting blade 50 fitted to the cutting unit 38B (see FIG. 1) and a cutting blade 50 to be newly fitted to the cutting unit 38B is fixed to another end side of the shaft 106. The blade holding units 170A and 170B each include a plate-shaped supporting member 172 formed in an oblong shape as viewed from the side and fixed to a distal end portion of the shaft 106 and blade gripping units 174A and 174B provided on a surface side of the supporting member 172, the surface side facing an opposite side from the power transmitting mechanism 104. The blade gripping unit 174A is fixed to one end side of the supporting member 172. The blade gripping unit 174B is fixed to another end side of the supporting member 172.

The blade gripping units 174A and 174B each include a cylindrical holding unit (gripping portion) 176 fixed to the supporting member 172. The holding unit 176 has a front surface 176a that faces the opposite side from the power transmitting mechanism 104. In addition, the holding unit 176 is provided with a positioning pin 178 that projects from the front surface 176a. The positioning pin 178 is formed such that a distal end portion of the positioning pin 178 corresponds to the position and size of the recessed portion 48b (see FIG. 2) formed in the supporting shaft 48 of the mount 44. The positioning pin 178 can therefore be inserted into the recessed portion 48b.

A plurality of gripping members 180 that grip the protruding portion 52b (see FIG. 2) of the cutting blade 50 are arranged on the periphery of the holding unit 176 at substantially equal intervals along the circumferential direction of the holding unit 176. The gripping members 180 are each formed in a columnar shape. Proximal end portions (one end sides) of the gripping members 180 are fixed to the outer circumferential surface of the holding unit 176. FIG. 10 depicts an example in which four gripping members 180 that grip the outer circumferential surface of the protruding portion 52b of the cutting blade 50 from four directions are provided. Distal end portions (another end side) of the gripping members 180 project from the front surface 176a of the holding unit 176. Contact portions 180a that come into contact with the outer circumferential surface of the protruding portion 52b of the cutting blade 50 are formed at the distal end portions. The distal end sides of the gripping members 180 are, for example, moved along the radial direction of the holding unit 176 by a moving mechanism (not depicted) housed within the holding unit 176. This moving mechanism switches between a state (closed state) in which the cutting blade 50 is gripped with the contact portions 180a in contact with the outer circumferential surface of the protruding portion 52b (see FIG. 2) of the cutting blade 50 and a state (opened state) in which the gripping of the cutting blade 50 is released with the contact portions 180a arranged more outward in the radial direction of the holding unit 176 than in the closed state.

The blade holding unit 170A replaces the cutting blade 50 fitted to the cutting unit 38A. Specifically, the blade gripping unit 174A of the blade holding unit 170A grips and holds the used cutting blade 50 fitted to the cutting unit 38A. In addition, the blade gripping unit 174B of the blade holding unit 170A grips and holds a replacement cutting blade 50 stored by the blade storage unit 70A (see FIG. 3). Similarly, the blade holding unit 170B replaces the cutting blade 50 fitted to the cutting unit 38B. Specifically, the blade gripping unit 174A of the blade holding unit 170B grips and holds the used cutting blade 50 fitted to the cutting unit 38B. In addition, the blade gripping unit 174B of the blade holding unit 170B grips and holds a replacement cutting blade 50 stored by the blade storage unit 70B (see FIG. 3).

When a plurality of gripping members 180 grip the protruding portion 52b of a cutting blade 50 from four directions, the cutting blade 50 is held such that the central position of the cutting blade 50 coincides with the central position of the holding unit 176 in the Y-axis direction. Therefore, even when there is a slight displacement in positional relation between the cutting blade 50 and the holding unit 176 immediately before the cutting blade 50 is held by the holding unit 176, alignment between the cutting blade 50 and the holding unit 176 is performed automatically by griping the cutting blade 50 by the plurality of gripping members 180.

In addition, the holding unit 176 is provided with a second mark portion 182 indicating the position of the holding unit 176. For example, the second mark portion 182 is a marker that is attached to the center of a distal end portion of the positioning pin 178 and which can be photographed by the camera 86 (see FIG. 4). FIG. 10 depicts the holding unit 176 provided with a cross-shaped mark as the second mark portion 182. As with the second mark portions 118 depicted in FIG. 5 and the like, second mark portions 182 are used for alignment between the storage sections 78 of the blade storage units 70A and 70B and the holding units 176 of the blade gripping units 174A and 174B. A method of the alignment using the second mark portions 182 is similar to the method of the alignment using the second mark portions 118. In addition, the kind, shape, position, and the like of the second mark portions 182 can be changed as appropriate as in the second mark portions 118.

In addition, in the foregoing embodiment, description has been made of the cutting units 38A and 38B in which the cutting blades 50 are fixed by the nuts 56. However, the cutting units 38A and 38B may have mechanisms of sucking and holding the cutting blades 50. In this case, the nuts 56 for fixing the cutting blades 50 are not necessary. It is thereby possible to omit the nut attaching and detaching unit 130 of the attaching and detaching unit 98, and thus achieve a reduction in weight of the attaching and detaching unit 98.

In addition, in the foregoing embodiment, description has been made of an example in which the blade suction units 114A and 114B are configured to face sideward of the blade attaching and detaching unit 100 (see FIG. 5 and the like). However, the blade attaching and detaching unit 100 may be configured to be movable (rotatable) such that the blade suction units 114A and 114B face downward of the blade attaching and detaching unit 100. In this case, the rotary shaft 74 (see FIG. 4 and the like) may be disposed along the Z-axis direction, and the front surface 76a of the supporting member 76 (front surfaces 80a of the supporting members 80) may be disposed along a direction parallel with the X-axis direction and the Y-axis direction. In a case where the blade suction units 114A and 114B are opposed to the front surface 76a of the supporting member 76 in the Z-axis direction as described above, the supporting members 76 are provided directly below the movement paths of the blade suction units 114A and 114B. In addition, the attaching and detaching unit 98 may be connected with a moving mechanism (robot arm or the like) that moves the blade suction units 114A and 114B to a desired position.

Moreover, structures, methods, and the like according to the foregoing embodiment can be modified and implemented as appropriate without departing from the objective scope of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An adjusting method of a blade replacing apparatus for replacing a cutting blade that is fixed to a distal end portion of a spindle included in a cutting apparatus and is configured to cut a workpiece, the blade replacing apparatus including
a blade storage unit including a movable storage section configured to store the cutting blade on a front side of a transparent supporting member,
a transporting unit configured to transport the cutting blade, the transporting unit including a holding unit configured to hold the cutting blade and a moving mechanism configured to move the holding unit between the storage section and the spindle,
a camera disposed on a back side of the supporting member and configured to photograph the holding unit positioned on the front side of the supporting member via the supporting member, and
a control unit including an operation control section configured to control operation of the blade storage unit and the transporting unit and a position registration section in which positions of the storage section and the holding unit when the cutting blade is attached or detached to or from the blade storage unit are registered, the storage section including a first mark portion photographable by the camera, and
the holding unit including a second mark portion photographable by the camera, the adjusting method comprising:

a registering step of obtaining an image including the first mark portion and the second mark portion by photographing the first mark portion and photographing the second mark portion through the supporting member by the camera, and registering the positions of the storage section and the holding unit when the first mark portion and the second mark portion are arranged in predetermined positional relation on a basis of the image as designated positions in the position registration section;

a determining step of moving the storage section and the holding unit such that the storage section and the holding unit are arranged at the designated positions registered in the position registration section, and determining whether or not the first mark portion and the second mark portion are arranged in the predetermined positional relation; and an overwriting step of overwriting the positions of the storage section and the holding unit as the designated positions in the position registration section after adjusting the position of the storage section or the holding unit such that the first mark portion and the second mark portion are arranged in the predetermined relation when the determining step determines that the first mark portion and the second mark portion are not arranged in the predetermined positional relation.

2. The adjusting method of the blade replacing apparatus according to claim 1, wherein the holding unit is a sucking and holding portion configured to suck and hold the cutting blade or a gripping portion configured to grip the cutting blade.

* * * * *